(12) United States Patent
De Cremer et al.

(10) Patent No.: US 8,115,374 B2
(45) Date of Patent: Feb. 14, 2012

(54) EMISSIVE LAMPS COMPRISING METAL CLUSTERS CONFINED IN MOLECULAR SIEVES

(75) Inventors: Gert De Cremer, Langdorp (BE); Dirk De Vos, Holsbeek (BE); Johan Hofkens, Brecht (BE); Maarten Roeffaers, Hasselt (BE); Bert Sels, Balen (BE); Tom Vosch, Heverlee (BE)

(73) Assignee: Katholieke Universiteit Leuven, Leuven (BE)

( * ) Notice: Subject to any disclaimer, the term of this patent is extended or adjusted under 35 U.S.C. 154(b) by 214 days.

(21) Appl. No.: 12/668,160

(22) PCT Filed: Jul. 7, 2008

(86) PCT No.: PCT/BE2008/000050
§ 371 (c)(1),
(2), (4) Date: Jan. 7, 2010

(87) PCT Pub. No.: WO2009/006707
PCT Pub. Date: Jan. 15, 2009

(65) Prior Publication Data
US 2011/0018425 A1    Jan. 27, 2011

(30) Foreign Application Priority Data

| Jul. 9, 2007 | (GB) | 0713250.9 |
| Dec. 14, 2007 | (GB) | 0724442.9 |
| Feb. 7, 2008 | (GB) | 0802265.9 |
| Feb. 11, 2008 | (GB) | 0802400.2 |
| Feb. 21, 2008 | (GB) | 0803185.8 |

(51) Int. Cl.
*C09K 11/58* (2006.01)
*H01J 1/62* (2006.01)

(52) U.S. Cl. .................. 313/483; 313/635; 313/486
(58) Field of Classification Search .................. None
See application file for complete search history.

(56) References Cited

U.S. PATENT DOCUMENTS

| 4,028,291 A | 6/1977 | Tsuchiya et al. |
| 4,064,521 A | 12/1977 | Carlson |
| 4,169,821 A | 10/1979 | Werner et al. |
| 4,196,033 A | 4/1980 | Arai et al. |
| 4,253,397 A | 3/1981 | Emmons et al. |
| 4,262,936 A | 4/1981 | Miyamoto |

(Continued)

FOREIGN PATENT DOCUMENTS

EP    1174905 A1    1/2002

(Continued)

OTHER PUBLICATIONS

Bogdanchikova, Nina E. et al., "Stability of silver clusters in mordenites with different SiO2/Al2O3SiO2/Al2O3SiO2/Al2O3 molar ratio",Applied Surface Science 150, 1999, 58-64.

(Continued)

*Primary Examiner* — Ashok Patel
(74) *Attorney, Agent, or Firm* — Bacon & Thomas PLLC

(57) ABSTRACT

The present invention concerns an illumination system comprising radiation source that when operational emits radiation in wave length range below 280 nm to an emission element that comprises an assembly of oligo atomic metal clusters confined in molecular sieve for converting invisible radiation emitted by a radiation source at room temperature or an higher temperature to visible light and further a transparent envelope said illumination system.

19 Claims, 10 Drawing Sheets

U.S. PATENT DOCUMENTS

| | | | |
|---|---|---|---|
| 4,357,164 | A | 11/1982 | Tsuji et al. |
| 4,968,631 | A | 11/1990 | Dakubu |
| 4,990,789 | A | 2/1991 | Uesaki |
| 5,075,699 | A | 12/1991 | Koike et al. |
| 5,286,287 | A | 2/1994 | Hirasawa et al. |
| 5,334,913 | A | 8/1994 | Ury et al. |
| 5,431,721 | A | 7/1995 | Pennaz et al. |
| 5,500,054 | A | 3/1996 | Goldstein |
| 5,686,368 | A | 11/1997 | Wong |
| 5,886,066 | A | 3/1999 | Forschirm |
| 5,891,943 | A | 4/1999 | Katsumata et al. |
| 5,965,633 | A | 10/1999 | Revol |
| 6,027,666 | A | 2/2000 | Ozin et al. |
| 6,104,031 | A | 8/2000 | Goldstein et al. |
| 6,121,187 | A | 9/2000 | Maier |
| 6,613,813 | B1 | 9/2003 | Borgmann et al. |
| 6,753,287 | B1 | 6/2004 | Weisbeck et al. |
| 6,855,304 | B2 | 2/2005 | Morita et al. |
| 6,977,237 | B2 | 12/2005 | Geerlings et al. |
| 7,055,756 | B2 | 6/2006 | Anderson et al. |
| 7,067,072 | B2 | 6/2006 | Chen |
| 7,126,136 | B2 | 10/2006 | Chen |
| 7,132,093 | B2 | 11/2006 | Kaliaguine et al. |
| 2003/0064532 | A1 | 4/2003 | Chen |
| 2005/0163992 | A1 | 7/2005 | Canos et al. |
| 2006/0169971 | A1 | 8/2006 | Cho et al. |
| 2007/0267058 | A1 | 11/2007 | Naum |
| 2009/0280589 | A1* | 11/2009 | Ikeda et al. ............ 438/29 |
| 2010/0254153 | A1* | 10/2010 | Hama et al. ............ 362/551 |

FOREIGN PATENT DOCUMENTS

| | | |
|---|---|---|
| EP | 1873202 A1 | 1/2008 |
| JP | 61061894 A | 3/1986 |
| WO | 9729165 A1 | 8/1997 |
| WO | 9965085 A1 | 12/1999 |
| WO | 03058728 A1 | 7/2003 |
| WO | 2005097679 A1 | 10/2005 |
| WO | 2007107452 A1 | 9/2007 |

OTHER PUBLICATIONS

Bonacic-Koutecky, V. et al., "Effective core potential-configuration interaction study of electronic structure and geometry of small neutral and cationic Agn clusters: Predictions and interpretation of measured properties", Journal of Chemical Physics 98(10), 1993, 7981-7994.

Bonacic-Koutecky, V. et al., "An accurate relativistic effective core potential for excited states of Ag atom: An application for studying the absorption spectra of Agn and Ag+n clusters", Journal of Chemical Physics 110(8), 1999, 3876-3886.

Bonacic-Koutecky, V. et al., Ab initio study of the absorption spectra of Agn (n-5-8) clusters, Journal of Chemical Physics 115(22), 2001, 10450-10460.

Bonacic-Koutecky, V. et al., "Tailoring the chemical reactivity and optical properties of clusters by size, structures and lasers", European Physical Journal D 34, 2005, 113-118.

Calzaferri, G. et al., The electronic structure of Cu+, Ag+, and Au+ zeolites, Chemical Society Reviews 32, 2003, 29-37.

Chen, Wei et al. "Photostimulated luminescence of sliver clusters in zeolite-Y", Physics Letters A 232, 1997, vol. 232, No. 5, 391-394, North-Holland Publishing Co., Amsterdam, NL.

Chen, Wei et al. "Photostimulated luminescence and dynamics of AgI and Ag nanoclusters in zeolites", Physical Review B, 2002, vol. 65, 245404-1-245404-8, Weinheim, Germany.

Dag, Omer et al., "Photoluminescent Silicon Clusters in Oriented Hexagonal Mesoporous Silica Film", Advanced Materials, Wiley VCH, 1999, vol. 11, No. 6, 474-480.

De Cremer, Gert et al., "Photoactivation of Silver-Exchanged Zeolite A", Angewandte Chemie—International Edition, Wiley VCH, 2008, vol. 47, No. 15, 2813-2816, Weinheim, Germany.

Fredigo, S. et al., "Optical response of Ag2, Ag3, Au2, and Au3 in argon matrices", Journal of Chemical Physics 99(8), 1993, 5712-5717.

Felix, C. et al., "Fluorescence and excitation spectra of Ag4 in an argon matrix", Chemical Physics Letters 313, Elsevier, 1999, 105-109.

Fierro-Gonzalez, J.C. et al., "Gold Nanoclusters Entrapped in the a-Cages of Y Zeolites: Structural Characterization by X-ray Absorption Spectroscopy" J. Phys. Chem. C, 2007, vol. 111, No. 18, 6645-6651.

Jacobs, P.A. et al., "Some Unusual Properties of Activated and Reduced AgNaA Zeolites", Journal of the Chemical Society—Faraday Transactions [ 75, 1979, 56-64.

Kanan, M.C. et al., "Luminescence properties of silver(I)-exchanged zeolite Y and its use as a catalyst to photodecompose carbaryl in the presence of natural organic matter", Research on Chemical Intermediaries, vol. 29, No. 7, 2003, 691-704.

Konig, L. et al., Chemilunescence in the Agglomeration of Metal Clusters, Science, vol. 274, 1996, 1353-1355.

Lee, Tae-Hee et al., "Strongly enhanced field-dependent single-molecule electroluminescence", Proc. Natl. Acad. Sci., vol. 99, No. 16, 2002, 10272-10275, USA.

Lee, Tae-Hee et al., "Asymmetric Photoconductivity within Nanoscale Break Junctions", Nano Letters, vol. 3, No. 11, 2003, 1561-1564, USA.

Lee, Tae-Hee et al., "Single-Molecule Optoelectronics", Accounts of Chemical Research, vol. 38, No. 7, 2005, 534-541, USA.

Lezhnina, M.M. et al., "Rare-Earth Ions in Porous Matrices", Physics of the Solid State, 2005, vol. 47, No. 8, 1479-1484.

Ozin, G.A. et al., "Silver sodalites: novel optically responsive nanocomposites", Inclusion Phenom. Mol. Recognit., [Proc. Int. Symp.] 5th, 1990, 379-393.

Patterson, H.H. et al., "Nanoclusters of silver doped in zeolites as photocatalysts", Catalysis Today, Elsevier, 2006, vol. 120, No. 2, 168-173.

Peyser, L.A. et al., "Photoactivated Fluorescence from Individual Silver Nanoclusters", Science, vol. 291, 2001, 103-106.

Primachenko, V.E. et al., "The Electronic and Emissive Properties of Au-Doped Porous Silicon", Semiconductors, 2005, vol. 39, No. 5, 565-571.

Qiao, Bin et al., "The Application of Porous Anodic Aluminum Oxide Membrane in Luminescence", Key Engineering Materials, 2005, vol. 280-283, 505-508.

Rabin, I et al. "Light emission during the agglomeration of silver clusters in noble gas matrices", Journal of Chemical Physics, vol. 108, No. 12, 1998, 5137-5142.

Rabin, I et al. "Light Emission in Matrix Assisted Cluster-Cluster Reactions", Crystal Research and Technology, vol. 33, Nos. 7-8, 1998, 1075-1084.

Rabin, I et al. "Absorption spectra of small silver clusters Agn (n ≧ 3)", Chemical Physics Letters, Elsevier, vol. 312, 1999, 394-398.

Rabin, I et al. "Absorption and fluorescence spectra of Ar-matrix-isolated Ag3 clusters", Chemical Physics Letters, Elsevier, vol. 320, 2000, 59-64.

Schmid, G. et al., "Physical and Chemical Properties of Large Metal and Semiconductor Clusters in View of Future Applications", Journal of Cluster Science, 1999, vol. 10, No. 2, 223-237.

Schulz-Ekloff, G., "Zeolite-hosted metal and semiconductors as advanced materials", Zeolite Chemistry and Catalysis, 1991, 69, 65-78.

Stein, A. et al., "Silver Sodalites—A Chemistry Approach Towards Reversible Optical Data Storage", J. Soc. Photogr. Sci. Tecnol., 1990, vol. 53, No. 4, 322-328, Japan.

Stein, A. et al., "Sodalite supralattices: From molecules to clusters to expanded insulators, semiconductors and metals", Proceedings of the 9th International Zeolite Conference in Montreal, 1993, 93-125.

Wilcoxon, J.P. et al., "Photoluminescence from nanosize gold clusters", Journal of Chemical Physics, 1998, vol. 108, No. 21, 9137-9143, New York, NY.

Yoon, J. et al., "Ab initio study of the low-lying electronic states of Ag-3, Ag3, and Ag+3: A coupled-cluster approach", Journal of Chemical Physics, vol. 112, No. 21, 2000, 9335-9343.

Zheng, Jie and Dickson, R.M., "Individual water-soluble dendrimer-encapsulated silver nanodot fluorescence", J. Am. Chem. Soc., vol. 124, 2002, 13982-13983.

International Search Report in PCT/BE2008/000050, Dec. 9, 2008.

International Search Report in PCT/BE2008/000051, Sep. 2, 2009.
International Search Report in PCT/BE2008/000053, Dec. 9, 2008.
Search Report of UK IPO regarding GB 0724442.9, Apr. 11, 2008.
Search Report of UK IPO regarding GB 0802400.2, Jul. 29, 2008.
Bein et al., "Formation and Characterization of Inorganic Membranes from Zeolite-Silica Microcomposites", Materials Research Society Symposium Proceedings, 1988, vol. 121, pp. 761-766.
Duval et al., "Preparation of Zeolite Filled Glassy Polymer Membranes", J. Appl. Polym. Sci., 1994, vol. 54, pp. 409-418.
Hu, Yi and Mackenzie, J.D., "Rubber-like elasticity of organically modified silicates", J. Mater. Sci., 1992, vol. 27, pp. 4415-4420.
Hu et al., "Gelation kinetics of an organically modified silicate", J. Mater. Sci., 1993, vol. 28, pp. 6549-6554.
Iwamoto, T. and Mackenzie, J.D., "Ormosil coatings of high hardness", J. Mater. Sci., 1995, vol. 30, pp. 2566-2570.

Mackenzie et al., "Rubbery ormosils and their applications", J. Non-Cryst. Sol., 1992, vols. 147 and 148, pp. 271-279.
Nazeri et al., "Ceramic Composites by the Sol-Gel Method: A Review", Ceram. Eng. Sci. Proc., 1993, vol. 14, pp. 1-19.
Rose et al., "Multifunctional Acrylate Alkoxysilanes for Polymeric Materials", Materials Research Society Symposium Proceedings, 1992, vol. 271, pp. 731-736.
Schottner et al., "Concepts for the Design of Intelligent Organic-Inorganic Hybrid Polymers", Intell. Mater. & Sys., 1995, pp. 251-262.
Rose, K., "Photo-crosslinked Polysiloxanes—Properties and Applications", Organosilicon Chemistry II, 1992, pp. 649-653.

* cited by examiner

_US 8,115,374 B2_

EMISSIVE LAMPS COMPRISING METAL CLUSTERS CONFINED IN MOLECULAR SIEVES

FIELD OF THE INVENTION

The present invention relates generally to white light and colored light emission using confined metal atomic clusters, preferably silicium, silver, copper and gold, and more particularly to the use of molecular sieves comprising oligo atomic silver clusters as luminescent materials for photoluminescence based lighting.

BACKGROUND OF THE INVENTION

The present invention concerns emissive lamps similar to fluorescent lamps comprising emissive material of confined metal oligo atomic clusters in molecular sieves, for instance zeolites.

In recent years, expertise has been gained in the synthesis of zeolites with desired properties by the choice of the structure directing agent (SDA), control of the synthesis conditions, and post-synthesis treatments. (Ref van Bekkum, H., Flanigen, E. M., Jacobs, P. A., Jansen. J. C. (editors) *Introduction to Zeolite Science and Practice, 2nd edition. Studies in Surface Science and Catalysis,* 2001, 137; Corina, A., *Chem. Rev.,* 1997, 97, 2373-2419; Davis, M. E., *Nature,* 2002, 417, 813-821; Davis, M. E., et al., *Chem. Mater.,* 1992, 4, 756-768; de Moor P-P. E. A. et al., *Chem. Eur. J.,* 1999, 5(7J, 2083-2088; Galo, J. de A. A., et al., *Chew. Rev.* 2002, 102, 4093-4138.) At the same time, the family of ordered mesoporous materials has been greatly expanded by the use of different surfactants and synthesis conditions. (Ref: Corina, A., *Chem. Rev.,* 1997, 97, 2373-2419; Davis, M. E. *Nature,* 2002, 417, 813-821; Galo, J. de A. A., et al., *Chem. Rev.,* 2002, 102, 4093-4138; Ying, J. Y., et al., Angew. *Chem. Int. Ed.,* 1999, 3S, 56-77.) The use of the appropriate template enables the control of the pore size, distribution and connectivity during the zeolite synthesis. For example, use of surfactants such as cetyltrimethylammonium bromide or dodecyltrimethylammonium bromide generally results in formation of mesoporous materials. In a preferred embodiment, the molecular sieves are one or more selected from the group consisting of mordenite, ZSM-5, A-zeolite, L-zeolite, faujasite, ferrierite, chabazite type of zeolites, and mixtures of the foregoing zeolites.

The materials of present invention, for instance zeolites containing oligo silver atom clusters, are cheap and non toxic. Zeolites are currently used in large quantities in washing powder and silver despite its antimicrobial properties, has no known toxic effect on human tissue. Colloidal silver is for instance widely been marketed as a dietary supplement for protective activity against oxidative stress and reactive oxygen species formation.

In contrast to bulk metals which are devoid of a band gap, and hence are good electric conductors, small Au or Ag clusters display interesting emissive properties from discrete energy levels. This phenomenon has been demonstrated e.g., for silver smaller than 100 atoms in rare gas matrices, in aqueous solutions and on silver oxide films. Quantum chemical calculations confirm the molecular character and discrete energy states of these small silver clusters. (Ref 1. Johnston, R. L. (2002) *Atomic and Molecular Clusters*(Taylor & Francis, London and New York); Rabin, I., Schulze, W., Ertl, G., Felix, C., Sieber, C., Harbich, W., & Buttet, J. (2000)*Chemical Physics Letters* 320, 59-64: Peyser, L. A., Vinson, A. E., Bartko, A. P., & Dickson. R. M. (2001) *Science* 291, 103-106: Lee, T.-H., Gonzalez, J. I., & Dickson, R. M. (2002) *Proc. Natl. Acad. Sci. USA* 99, 10272-10275; Lee, T. H., Gonzalez, J. I., Zheng, J., & Dickson, R. M. (2005) *Accounts of Chemical Research* 38, 534-541; Bonacic-Koutecky, V, Mitric, R., Burgel, C., Noack, H., Hartmann, M., & Pittner, J. (2005) *European Physical Journal D* 34, 113-118; Lee, T.-H, Hladik, C. R., & Dickson, R. M. (2003) *Nano Letters* 3, 1561-1564; Rabin, I., Schulze, W. & Ertl, G. (1999) *Chemical Physics Letters* 312, 394-398; Felix, C., Sieber, C., Harbich, W., Buttet, J., Rabin, I., Schulze, W., & Ertl, G. (1999) *Chemical Physics Letters* 313, 105-109: Rabin, I., Schulze, W., & Ertl, G. (1998) *Crystal Research and Technology* 33, 1075-1084; Rabin, I., Schulze, W., & Ertl, G. (1998) *Journal of Chemical Physics* 108, 5137-5142; Konig, L., Rabin, I., Schulze, W., & Ertl. G. (1996) *Science* 274, 1353-1355; Zheng. J. & Dickson, R. M. (2002) *Journal of the American Chemical Society* 124, 13982-13983; Bonacic'-Koutecky, V., Veyret, V., & Mitric', R. (2001) *Journal of Chemical Physics* 115, 10450-10460; Bonacic-Koutecky, V., Pittner, J., Boiron, M., & Fantucci, P. (1999) *Journal of Chemical Physics* 110, 3876; Bonacic'-Koutecky, V., Cespiva, L., Fantucci, P., & Koutecky, J. (1993) *Journal of Chemical Physics* 98, 7981-7994; Yoon, J., Kim, K. S., & Baeck, K. K. (2000) *Journal of Chemical Physics* 1.12, 9335-9342; Fedrigo, S., Harbich, W., & Buttet, J. (1993) *Journal of Chemical Physics* 99, 5712-5717.)

The major problem in the study and creation of small Au or Ag clusters is aggregation to large nanoparticles and eventually to bulk metal, with loss of emission. Here, it is demonstrated that the use of porous structures with limited pore, cavity and tunnel sizes, overcomes the aggregation problem enabling emissive entities, which are stable in time.

Silver cluster in molecular sieves exhibit remarkable stability. (Ref Bogdanchikova, N. E., Petranovskii, V. P., Machorro, R., Sugi, Y., Soto, V. M., & Fuentes, S. (1999) *Applied Surface Science* 150, 58-64.) Bogdanchikova et al. found that the stability of the silver clusters depends on the acid strength, which may be related to the composition, e.g. the $SiO_2/Al_2O_3$ molar ratio, of the molecular sieves. Silver clusters in mordenites having weak acidic sites are stable for at least 50 months, a sufficiently long period with respect to the application in mind for use in a visible light source. Disappearance of the clusters was linked to oxidation. Reduction of the clusters or an oxygen-free or -poor device obviously could increase the stability even more. In one embodiment in the present invention, Au or Ag clusters are protected from oxidation due to encapsulation in the molecular sieves. Additionally, if required, an external coating of the material crystals or capping of the pore entrances can be used to further protect the occluded metal clusters.

The current state of the art has never suggested or demonstrated the room temperature conversion of invisible light, e.g., with energy in the UV region, to a lower energy, e.g., visible light, by oligo atomic metal clusters embedded in molecular sieves.

Some technologies of the art concern the photophysical properties of zeolites loaded with silver. For instance, Chen et al. loaded Y zeolites with AgI, instead of silver clusters, and pumped or charged with 254 nm light, however, without observation or description of visible emission. (Chen, W., Joly, A. G., & Roark, J. (2002) Physical Review B 65, 245404 Artn 245404, U.S. Pat. No. 7,067,072 and U.S. Pat. No. 7,126,136). Calzaferri et al. demonstrated absorption of 254 nm light by silver metal containing zeolites without any notification of emission (Calzaferri, G., Leiggener, C., Glaus, S., Schurch, D., & Kuge, K. (2003) Chemical Society Reviews 32, 29-37.). Kanan et al., showed some emission intensity for silver(I)-exchanged zeolite Y, however only when excited at temperatures below 200 K. (Kanan, M. C., Kanan, S. M., & Patterson, H. H. (2003) Research on Chemical Intermediates 29, 691-704). In summary; the examples do not meet the requirement for applications in lamp or illuminating systems or devices, such as the ones in mind for the present invention.

Present invention concerns the field of visible light lamps, and related, comprising e.g., white light and colored luminescent materials with emission of visible white or colored light at or above room temperature. Such devices thus comprise luminescent materials for photoluminescence based lighting generated through the action of confined metal oligo atomic clusters, more particularly oligo atomic silver clusters loaded in molecular sieves (e.g., zeolites like the A3, A4 and A5 zeolite).

It was particularly found that such emissive materials have properties that are capable of converting light in the UV radiation range such as, but not limited to 254 nm, which is the emission line of the primary Hg UV source commonly used now in fluorescent lamps, to visible light. An additional advantage is the tunability of the devices over the whole UV excitation range. Furthermore, the emissive materials of present invention do not show large absorptions in the visible range, which would lower the overall emission efficiency of the system.

The present invention relates generally to white and colored light emission using confined oligo atomic metal clusters, and more particularly to the use of molecular sieves comprising of these oligo atomic metal clusters as luminescent materials for photoluminescence based lighting.

The extremely high and stable luminescence after activation allows the recording of emission wavelength depending decay curves, demonstrating the existence of multiple emitters. The molecular sieves comprising oligo atomic silver clusters are used as luminescent materials for photoluminescence based lighting.

The bright and stable luminescence of the molecular sieves comprising of these oligo atomic metal clusters in luminescent materials of present invention can be used as a secondary light source in fluorescence lamps or as labels or e.g. biolabels or security labels.

SUMMARY OF THE INVENTION

The present invention solves problems of the related art by providing low energy consuming lamps.

In accordance with the purpose of the invention, as embodied and broadly described herein, the invention is broadly drawn to an illuminating system comprising radiation sources that upon excitation using wavelengths below 400 nm, preferably below 300 nm, emits radiation in or close to the visible range. In accordance with the purpose of the invention, the invention comprises an assembly of small clusters of the noble metals of the group consisting of gold, silver, platinum, palladium, silicium and rhodium, preferably Au and/or Ag clusters confined in molecular sieves, preferably zeolites, for converting invisible radiation emitted by a radiation source at room temperature of an higher temperature to visible light and further a transparent envelope said illumination system. Such illumination system can further comprising a light transmission member or transmission means for transmitting the visible light in a desired direction. Furthermore the radiation source can be in direct contact with or connected by a radiation transmission member or a radiation transmission means for transmitting the rays to the emission means. Such system may further comprise an illumination system of any of the previous claims, further comprising a light transmission member or a transmission means for transmitting the visible light in a desired direction. The radiation transmission member or radiation transmission means directs the exciting radiation to the assembly of small Au and/or Ag clusters confined in molecular sieves.

In one aspect of the invention, the illumination system of present invention comprises a radiation source, which is medium wave UV (UVC) ray radiation source or the radiation source can be Far UV (FUV) or vacuum UV (VUV) ray radiation source or it can be an Extreme UV (EUV) or deep UV (XUV) ray radiation source.

In another aspect of the invention, the illumination system is surrounded by an envelope. This envelope can for instance be a bulb or a tube, and is preferably radiation resistant, for instance UV resistant.

In one aspect of the invention, the illumination system of present invention comprises an assembly containing oligo atomic metal clusters, e.g., of Au, Ag and/or alloys thereof, confined in molecular sieves, which are embedded in a matrix. Such matrix may further comprise a particle binder. The assembly can be a powder assembly of small Au and/or Ag clusters confined in molecular sieves.

In a particular aspect of present invention, the illumination system has a radiation source which is a laser, a light emitting diode radiation source or other types of excitation sources such as Hg and D lamps.

The illumination system can be used for the generation of white light and or specific colored light and at a predetermined color temperature. Because it is the standard against which other light sources are compared, the color temperature of the thermal radiation from an ideal black body radiator is defined as equal to its surface temperature in kelvin, or alternatively in mired (micro-reciprocal degrees kelvin) (Wallace Roberts Stevens (1951). Principles of Lighting).

The clusters in the illumination system of present invention are oligo atomic clusters for instance of 1-100 atoms. The molecular sieves in this invention generally relate to the structurally ill-defined solids or materials whose pore size distribution is very narrow because it is controlled by the precisely repeating crystalline nature of the materials, microstructure. These materials are called "molecular sieves", the most important examples of which are zeolites. Certain zeolitic Materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolite material. Since the dimensions of these pores are such as to accept for adsorption molecules of certain dimensions while rejecting those of larger dimensions, these materials are known as "molecular sieves" and are utilized in a variety of ways to take advantage of these properties. Such molecular sieves, both natural and synthetic, include a wide variety of positive ion-containing crystalline silicates. These silicates can be described as a rigid three-dimensional framework of $SiO_4$ and Periodic Table Group IIIB element oxide, e.g. $AlO_4$, in which the tetrahedra are crosslinked by the sharing of oxygen atoms whereby the ratio of the total Group IIIB element, e.g. aluminum, and Group IVB element, e.g. silicon, atoms to oxygen atoms is 1:2.

The molecular sieves for present invention can be selected from the group consisting of zeolites, porous oxides, silicoaluminophosphates, gallophosphates, zincophophates, titanosilicates and aluminosilicates, or mixtures thereof. In a particular embodiment of present invention the molecular sieves of present invention are selected from among large pore zeolites from the group consisting of ZSM-5, MCM-22, ferrierite, faujastites X and Y. The molecular sieves in another embodiment of present invention are materials selected from the group consisting of zeolite 3A, Zeolite 13X, Zeolite 4A, Zeolite 5A and ZKF.

The oligo atomic metal clusters confined in molecular sieves or microporous structures can be incorporated in membranes or films for instance by embedding in transparent matrix materials such as silicone, epoxy, adhesives, polymethylmethacrylate, polycarbonate. Moreover the molecular sieves or the ordered comprising oligo atomic silver clusters of present invention can be incorporated in paints or fluids of film formers for coating on surface surfaces. Media (paints, gelling liquids, elastomers) are available and methods of manufacturing to achieve such membranes or films, for instance a filled elastomeric polymer, which comprise the oligo-atomic metal clusters confined in molecular sieves or in ordered porous oxides (microporous or mesoporous or mixed mesoporous/microporous) or porous materials with nanometer dimension (0.3-10 nm) windows, channels and cavity architectures. Typical but not exclusive examples of such elastomeric polymers are polydimethylsiloxane (silicone rubber), polyisobutene (butyl rubber), polybutadiene, polychloroprene, polyisoprene, styrene-butadiene rubber, acrylonitrile-butadiene rubber (NBR), ethene-propene-diene-rubber (EPDM) and acrylonitrile-butadiene-styrene (ABS). Such films or membranes of the molecular sieves comprising oligo atomic silver clusters; ordered mesoporous and/or microporous oxides comprising oligo atomic silver clusters or porous materials with nanometer dimension (e.g. 0.3-10 nm) windows, channels and cavity architectures comprising oligo atomic silver clusters can be coated on a substrate. Following the ASTM (American Society for Testing and Materials) standards, 'elastomers' are defined as "macromolecular materials that return to approximately the initial dimensions and shape after substantial deformation by a weak stress and release of the stress". Elastomers are sometimes also referred to as 'rubbery materials'. A 'rubber' is defined as "a material that is capable of recovering from large deformations quickly and forcibly, and can be, or already is, modified to a state in which it is essentially insoluble (but can swell) in boiling solvent, such as benzene, toluene, methyl ethyl ketone, and ethanol/toluene azeotrope".

In the preparation of membranes with the oligo atomic metal clusters confined in the microporous structures, the microporous structures are first dispersed in an appropriate solvent. An appropriate solvent is a solvent of low ionic strength, for instance an ionic strength of a value in the range of 1 mmol/L to 0.05 mol/L, and should be able to dissolve the elastomer as well, or at least, should be partially miscible with the solvent in which the membrane forming polymer is dissolved. To improve the dispersion, ultrasonic wave treatment, high speed mixing, modification reactions, can be applied.

The content of porous structures with oligo atomic metal clusters confined therein and polymer, in the dispersion, may range from 1 wt % to 80 wt %, preferably 20 wt % to 60 wt %. The dispersion is stirred for a certain time to allow (polymer/filler) interactions to establish, to improve dispersion and possibly to let a chemical reaction take place. When appropriate, the dispersion can be heated or sonicated.

The metal clusters in microporous materials are in molecular sieves or microporous structures, may be incorporated in paints or printing inks (e.g. printable matrix printing ink or printable paints, varnishes (e.g. overprinting varnishes) and paints for depositing, spraying, printing or painting a layer or a coating on a substrate. Printing inks or paints of the art which are suitable for comprising the emitting materials of present invention are for instance hard resins, colophony-modified phenol resins, maleate resins, hydrogenated mineral oil cuts, synthetic aromatic oils, alkyd resins in particular hydrocarbon resins and/or a colophony resin ester and dialkyl ether such as di-n-dodecyl ether, di-n-undecyl ether, allyl-n-octyl ether, n-hexyl-n-undecyl ether as a vehicle. Particular suitable solvents are the resin(s) water-insoluble fatty acid esters of polyvalent alcohols or ethinols. Suitable printing inks in the art are described in U.S. Pat. No. 4,028,291, U.S. Pat. No. 4,169,821, U.S. Pat. No. 4,196,033, U.S. Pat. No. 4,253,397, U.S. Pat. No. 4,262,936, U.S. Pat. No. 4,357,164, U.S. Pat. No. 5,075,699, U.S. Pat. No. 5,286,287, U.S. Pat. No. 5,431,721, U.S. Pat. No. 5,886,066, U.S. Pat. No. 5,891,943, U.S. Pat. No. 6,613,813 and U.S. Pat. No. 5,965,633. Such emitting material of present invention may be painted, printed or coated on the substrate.

Solvent casting or coating is used as the membrane preparation process.

A particular method of coating is solution-depositing of the molecular sieves comprising oligo atomic silver clusters comprises spray-coating, dip-casting, drop-casting, evaporating, blade-casting, or spin-coating the molecular sieves comprising oligo atomic silver clusters; ordered mesoporous and/or microporous oxides comprising oligo atomic silver clusters or porous materials with nanometer dimension (e.g. 0.3-10 nm) windows, channels and cavity architectures with an assembly of oligo atomic metal clusters confined in such structures (hereinafter the porous structures with oligo atomic metal clusters confined therein) onto a substrate The (polymer/porous structures with oligo atomic metal clusters confined therein) dispersion can be cast on a non-porous support from which it is released afterwards to form a self-supporting film. One way tot realise this is by soaking it previously with a solvent, which has a low affinity for the dispersion. Also, the support can be treated with adhesion promoters.

After casting or coating, the solvent is evaporated and, if necessary, a heat treatment can be applied to finish the cross-linking reactions. The heat treatment can possibly occur under vacuum conditions to remove the remaining solvent. The resulting supported membranes be a filled elastomer with the thickness of this selective layer in a range from 0.01 µm to 500 µm, preferably from 0.1 to 250 µm and yet more preferably from 10 to 150 µm. The most important elastomers are polyisoprene (natural or synthetic rubber (IR)), polychloroprene (chloroprene rubber (CR)), butyl rubber (BR), styrene-butadiene rubber (SBR), acrylonitrile-butadiene rubber (NBR), ethene-propene-diene-rubber (EPDM), acrylonitrile-butadiene-styrene (ABS), chlorosulfonated polyethylene (CSM), I polyacrylate (polyacrylic rubber), polyurethane elastomers, polydimethylsiloxane (PDMS, sometimes more generally referred to as silicone rubber), fluorosilicones and polysulfides. Polystyrene is a thermoplastic polymer that particularly resistant to irradiation.

The films with the porous structures of present invention may need particular characteristics according to its environment of use. A variety of alternatives polymers that provide design freedom which preparation protocols are available in the art to design complex shapes, to consolidate parts into fewer components, simplify production, to produce transparent and precolored components, to reduce part weight, to reduce noise when the porous structures with oligo atomic metal clusters is moving, to have a reliable performance at elevated temperature, to have chemical resistance in harsh climates, to have the desired stiffness, strength and toughness, to have hydrolytic stability over time, to have electrical properties to have a desired physical appearance Polymers that are suitable for incorporation of the porous structures of present invention are for instance Spire™ family of ultra polymers such as 1) KetaSpire® polyetheretherketone (PEEK) which is easy-to-mold ultra polymer offering outstanding chemical resistance and mechanical performance up to 300° C. (570° F.) or AvaSpire® modified PEEK, a PEEK-based formulations or 2) PrimoSpire® self-reinforced polyphenylene (SRP) known to be designable in a very stiff, strong unreinforced polymer with a remarkable combination of surface hardness, chemical resistance and inherent flame-retardant properties or 3) EpiSpire™, an high-temperature sulfone (HTS) known to be a transparent amorphous polymer with excellent creep resistance at temperatures up to 265° C. (510° F.) or 4) Torlon® polyamide-imide (PAI) with higher strength and stiffness that most thermoplastic up to 275° C. (525° F.) combined with superior resistance to chemicals, creep and wear. Other polymers that are suitable for incorporation of the porous structures with oligo atomic metal clusters confined therein of present invention are the family of amorphous sulfone polymers such as 1) Udel® PSU known to be designable into tough, transparent plastic with exceptional chemical resistance, good hydrolytic stability and an HDT of 345° F. (174° C.) or the 2) Mindel® modified polysulfone with superior electrical propertiesor 3) the Radel® R (PPSU) known to deliver a super-tough transparent plastic with an HDT of 405° F. (207° C.), excellent chemical resistance and the unique ability to be steam sterilized without significant loss of properties or 4) the Radel® A (PES) know to deliver a transparent plastic with a high HDT of 400° F. (204° C.) and good chemical resistance or the Acudel® modified PPSU. Other polymers that are suitable for incorporation of the porous structures with oligo atomic metal clusters confined therein of present invention are for instance the semi-crystalline aromatic polyamides such as for instance the Amodel® polyphthalamide (PPA) known to deliver a high-temperature nylon with exceptional mechanical properties, an HDT of 535° F. (280° C.), excellent chemical resistance and low moisture uptake or the Ixef® polyarylamide (PA MXD6) known to deliver aesthetic, structural specialty nylon that combines outstanding stiffness with exceptional surface appearance, plus low and slow water uptake, and great flow properties. Other polymers that are suitable for incorporation of the porous structures with oligo atomic metal clusters confined therein of present invention are for instance semi-crystalline polymers such as the Primef® polyphenylene sulfide (PPS) which delivers a high-flow, structural plastic with good temperature and chemical resistance as well as inherent flame retardant properties or the Xydar® liquid crystal polymer (LCP) known to deliver high-flow, high-temperature plastic with an HDT of 570° F. (300° C.), and extremely high chemical resistance. These are available with design and processing guides form Solvay Advanced Polymers.

A particular example of manufacturing emitting film based on the porous structures oligo atomic metal clusters confined therein of present invention and a polymer is for instance the use of polydimethylsiloxane (PDMS), RTV-615 A and B (density 1.02 g/ml) and the adhesion promoter (SS 4155) which are obtainable from General Electric Corp. (USA). Component A is a prepolymer with vinyl groups. Component B has hydride groups and acts as cross-linker and EPDM (Keltan 578 from DSM) and porous structures with oligo atomic metal clusters confined therein of present invention which are well dried before use. Such can be produced by preparing dispersing a powder of the porous structures with oligo atomic metal clusters confined therein of present invention (for instance a zeolite comprising oligo atomic silver clusters) in hexane adding the cross-linker (RTV 615 B) to the dispersion of porous structures with oligo atomic metal clusters confined therein of present invention and stirring this mixture at 40° C. for two hours to allow sufficient time to establish strong interactions between both phases. Adding the prepolymer (RTV 615 A) and stirring the mixture for another hour at 60° C. to induce prepolymerisation. Pouring the (PDMS/ZSM-5 CBV 3002) in a petridish and allowing the solvent to evaporate for several hours and the resulting film was cured at 100° C. The content of the solid components (i.e. PDMS and filler) in the casting solution was 18.5 wt %. The RTV 615 A/B ratio for optimal polymer curing was 7 in order compensate for the loss of hydride groups due to their reaction with the surface silanol goups on the zeolite (normally it is in a 10/1 ratio, as proposed by the manufacturer to be the ratio for optimal curing).

For flexible substrates thermoplastics (e.g., Polyethylene naphthalate (PEN), Polyethersulfone (PES), Polycarbonate (PC), Polyethylene terephthalate (PET), Polypropylene (PP), oriented polypropylene (OPP), etc.), and glass (e.g., borosilicate) substrates may be used for these applications. Low liquidus temperature material, which typically has a low liquidus temperature (or in specific embodiments a low glass transition temperature can be used form a barrier layer on a flexible substrate and can be can be deposited onto the flexible substrate by, for example, sputtering, co-evaporation, laser ablation, flash evaporation, spraying, pouring, frit-deposition, vapor-deposition, dip-coating, painting or rolling, spin-coating, or any combination thereof. The porous structures with oligo atomic metal clusters confined therein can be incorporated into the low liquidus temperature materials. Such low liquidus temperature material includes, but is not limited to, tin fluorophosphate glass, chalcogenide glass, tellurite glass and borate glass.

In a particular embodiment of present invention the pores of the molecular sieves containing the small clusters of, e.g., Au and/or Ag are coated with a matrix, or are closed by stopper molecules.

Furthermore the present invention also involves methods for converting at room temperature and above, invisible radiation to visible light comprising conversion of exciting radiation at a wavelength below 400 nm from said radiation sources by direct contact with or via radiation transmission means, element or medium to an assembly of small Au and/or Ag clusters confined in a molecular sieves.

To transfer the non-visible radiation into visible light, the light system of present invention does not require the presence of charge compensating anions, such as oxalate, hydroxide, azide, carbonate, bicarbonate, sulfate, sulfite, chlorate, perchlorate, acetate and formate to be in charge association with the noble metals, such as the small metal clusters.

Further scope of applicability of the present invention becomes apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. It is to be understood that both the foregoing general description and the following detailed description are exemplary and explanatory only and are not restrictive of the invention, as claimed.

DETAILED DESCRIPTION OF EMBODIMENTS OF THE INVENTION

"Room temperature" as used in this application means a temperature between 12-30° C. (Celsius), preferably between 16 and 28° C., more preferably 17 and 25° C. and most preferably it is taken to be roughly 20 to 23 degrees.

By the term luminescence or emissive, the following types are included: chemoluminescence, crystalloluminescence, electroluminescence, photoluminescence, phosphorescence, fluorescence, thermoluminescence.

A "fluorescent lamp" is a gas-discharge lamp that uses electricity to excite mercury vapor in argon or neon gas, resulting in a plasma that produces short-wave ultraviolet light. This light then causes a phosphor to fluoresce, producing visible light.

Oligo atomic metal clusters include clusters ranging from 1 to 100 atoms of the following metals (sub nanometer size), Si, Cu, Ag, Au, Ni, Pd, Pt, RhCo and Ir or alloys thereof such as Ag/Cu, Au/Ni etc. The clusters can be neutral, positive or negatively charged. The oligo atomic metal clusters can be small oligo atomic silver-(and/or gold) molecules containing 1 to 100 atoms.

The articles "a" and "an" are used herein to refer to one or more than one (i.e., at least one) of the grammatical object of the article. By way of example, "an element" means one element or more than one element.

The terms "comprise" and "comprising" are used in the inclusive, open sense, meaning that additional elements may be included.

The term "including" is used to mean "including but not limited to". "Including" and "including but not limited to" are used interchangeably.

The term "in particular" is used to mean "in particular but not limited to". And the term "particularly" is used to mean "particularly but not limited to"

The term "zeolite" also refers to a group, or any member of a group, of structured aluminosilicate minerals comprising cations such as sodium and calcium or, less commonly, barium, beryllium, lithium, potassium, magnesium and strontium; characterized by the ratio (Al+Si):O=approximately 1:2, an open tetrahedral framework structure capable of ion exchange, and loosely held water molecules, that allow reversible dehydration. The term "zeolite" also includes "zeolite-related materials" or "zeotypes" which are prepared by replacing $Si^{4+}$ or $Al^{3+}$ with other elements as in the case of aluminophosphates (e.g., MeAPO, SAPO, ElAPO, MeAPSO, and ElAPSO), gallophosphates, zincophophates, titanosilicates, etc. The zeolite of present invention can be a crystalline porous material with a frame work as described in Pure Appl. Chem., Vol. 73. No. 2, pp. 381-394, © 2001 IUPAC or provided in the Zeolite Framework Types database of the IZA structure commission where under the following structure types, as defined by the International Zeolite Association such as ABW type, ACO type, AEI type, AEL type, AEN type, AET type, AFG AFI type, AFN type, AFO type, AFR type, AFS type, AFT type, AFX type, AFY type, AHT type, ANA type, APC type, APD type, AST type, ASV type, ATN type, ATO type, ATS type, ATT type, ATV type, AWO type, AWW type, BCT type, *BEA type, BEC type, BIK type, BOG type, BPH type, BRE type, CAN type, CAS type, CDO type, CFI type, CGF type, CGS type, CHA type, -CHI type, -CLO type, CON type, CZP type, DAC type, DDR type, DFO type, DFT type, DOH type, DON type, EAB type, EDI type, EMT type, EON type, EPI type, ERI type, ESV type, ETR type, EUO type, EZT type, FAR type, FAU type, FER type, FRA type, GIS type, GIU type, GME type, GON type, GOO type, HEU type, IFR type, IHW type, IMF type, ISV type, ITE type, ITH type, ITW type, IWR type, IWV type, IWW type, JBW type, KFI type, LAU type, LEV type, LIO type, -LIT type, LOS type, LOV type, LTA type, LTL type, LTN type, MAR type, MAZ type, MEI type, MEL type, MEP type, MER type, MFI type, MFS type, MON type, MOR type, MOZ type, MSE type, MSO type, MTF type, MTN type, MTT type, MTW type, MWW type, NAB type, NAT type, NES type, NON type, NPO type, NSI type, OBW type, OFF type, OSI type, OSO type, OWE type, -PAR type, PAU type, PHI type, PON type, RHO type, -RON type, RRO type, RSN type, RTE type, RTH type, RUT type, RWR type, RWY type, SAO type, SAS type, SAT type, SAV type, SBE type, SBN type, SBS type, SBT type, SFE type, SFF type, SFG type, SFH type, SFN type, SFO type, SGT type, SW type, SOD type, SOS type, SSF type, SSY type, STF type, STI type, *STO type, STT type, SZR type, TER type, THO type, TOL type, TON type, TSC type, TUN type, UEI type, UFI type, UOZ type, USI type, UTL type, VET type, VFI type, VNI type, VSV type, WEI type, -WEN type, YUG type and ZON type. The term "zeolite" also includes "zeolite-related materials" or "zeotypes" which are prepared by replacing Si4+ or Al3+ with other elements as in the case of aluminophosphates (e.g., MeAPO, AlPO, SAPO, ElAPO, MeAPSO, and ElAPSO), gallophosphates, zincophophates, titanosilicates, etc.

The term "molecular sieves" as used herein refers to a solid with pores of the size of molecules. It includes, but is not limited to microporous and mesoporous materials. In the nomenclature of the molecular sieves the pore size of <20 Amstrong (Å) is considered microporous and 20-500 Å is considered mesoporous.

The term "microporous carrier" as used herein refers to a solid with pores the size of molecules. It includes but is not limited to microporous materials, ALPOs and (synthetic) zeolites, pillared or non-pillared clays, carbon molecular sieves, microporous titanosilicates such as ETS-10, microporous oxides. Microporous carriers can have multimodal pore size distribution, also referred to as ordered ultramicropores (typically less than 0.7 nm) and supermicropores (typically in the range of about 0.7-2 nm). A particular type of microporous carriers envisaged within the present invention, are the molecular sieve zeolites. Zeolites are the aluminosilicate members of the family of microporous carriers. The pore size of molecular sieves can further be influenced by the nature of the templating molecules in the synthesis. The addition of swelling agents to the synthesis mixture can further affect the pore size of the resulting molecular sieve. Zeolites with different pore size have been well characterized and described by Martin David Foster in "Computational Studies of the Topologies and Properties of Zeolites", The Royal Institution of Great Britain, Department of Chemistry, University College London, a thesis submitted for the degree of Doctor of Philosophy, London, January 2003.

A comprehensive list of the abbreviations utilized by organic chemists of ordinary skill in the art appears in the first issue of each volume of the Journal of Organic Chemistry; this list is typically presented in a table entitled Standard List of Abbreviations.

For purposes of this invention, the chemical elements are identified in accordance with the Periodic Table of the Elements, CAS version, Handbook of Chemistry and Physics, 67th Ed., 1986-87, inside cover. [Contemplated equivalents of the zeolitic structures, subunits and other compositions described above include such materials which otherwise correspond thereto, and which have the same general properties thereof (e.g., biocompatible), wherein one or more simple [variations of substituents are made which do not adversely affect the efficacy of such molecule to achieve its intended purpose. In general, the compounds of the present invention may be prepared by the methods illustrated in the general reaction schemes as, for [example, described below, or by modifications thereof, using readily available starting materials, reagents and conventional synthesis procedures. In these reactions, it is also possible to make use of variants which are in themselves known, but are not mentioned here.

a. "the molecular sieve matrix is selected from among microporous materials, selected from among zeolites, porous oxides, silicoaluminophosphates and aluminosilicates"

b. "zeolite selected from among the family of small pore sized zeolites such as zeolite A and ZKF, and combinations thereof"

c. "large pore zeolites such as ZSM-5, MCM-22, ferrierite, faujastites X and Y and microporous molecular sieves"

d. "The matrix can also be a molecular sieve selected from among molecular sieves MCM-41, MCM-48, HSM, SBA-15, and combinations thereof"

e. "Methods are available in the art for preparation of microporous zeolites."

f. "As used herein, microporous zeolites preferably have a pore size of about 3 angstroms to about 14 angstroms"

The term microporous materials also include amorphous microporous solids. Alternative amorphous microporous solids can be used for present invent. For instance amorphous microporous mixed oxides having, in dried form, a narrow pore size distribution (half width <±10% of the pore diameter) of micropores with diameters in the range of <3 nm and the preparation of said amorphous microporous mixed oxides have been well described in U.S. Pat. No. 6,121,187 and others have been well documented in WO0144308, U.S. Pat. No. 6,753,287, U.S. Pat. No. 6,855,304. U.S. Pat. No. 6,977,237, WO2005097679, U.S. Pat. No. 7,055,756 and U.S. Pat. No. 7,132,093"

It was also found that silver-exchanged single zeolite 3A crystals (LTA-topology; from Union Carbide) and the controllable photoactivation of this single crystal's emission upon UV-irradiation by using fluorescence microscopy results in a extremely bright fluorescent properties. The present invention involves methods for converting at room temperature and above, invisible radiation to visible light comprising conversion of exciting radiation at a wavelength below 400 nm from said radiation sources by direct contact with or via radiation transmission means, element or medium to an assembly of small Au and/or Ag clusters confined in a molecular sieves.

The molecular sieves comprising oligo atomic silver clusters as luminescent materials find a variety of other beside applications such as secondary light sources in fluorescence lamps thanks to their high emission intensity, exceptional photostability and large stokes shift. The space-resolved activation of the emission intensity can also be used in data storage application.

An example of such emissive particles are those prepared by exchanging 8±1% (w/w) of silver ions (from AgNO3) in a zeolite 3A (K-form; see Example 10). The subsequent heat treatment causes a partial (auto)reduction of the silver species. FIGS. 10 a (1) and b (1) show a typical scanning image of a roughly 3 by 3 µm silver-containing zeolite under a confocal microscope using a picosecond (ps) pulsed 375 nm (doubled Ti:Sapphire; see Example 10) excitation source of 10 and 20 W/cm2 for 10a respectively 10b. In the crystal shown in FIG. 10*a*, three individual diffraction limited spots are activated by 20 minute irradiation with the same ps 375 nm source at low power (10 W/cm2) (panels 1 till 4). This illustrates the write and read possibilities of the material in data storage applications. The crystal in FIG. 10*b* is totally activated by high power (16.7 kW/cm2) 375 nm excitation. After 5 minutes a 10-fold increase of the emission intensity as indicated in FIG. 10*b* (2) is realized. Another 20 minutes of high-intensity irradiation caused the emission to reach a steady state at a 20-fold intensity increase, as seen in FIG. 10*b* (3). FIG. 10*c* shows a true color image (in this application in grey scale) of the same crystal under UV-excitation at 16.7 kW/cm2 observed through the eyepiece of the microscope. In contrast to quantum dots [S. K. Ghosh, S. Kundu, M. Mandal, S, Nath, T. Pal, Journal of Nanoparticle Research 2003, 5, 577], being another type of bright and photostable emitters, the luminescence of this material doesn't show any blinking since the emission originates from multiple silver particle emitters confined within one crystal (see Example 10).

The dynamics of the activation process were monitored by recording emission spectra at 1 s intervals (or 10 s for the lowest excitation intensity). Plotting the emission intensity maxima of these spectra as a function of time upon different UV powers, reveals a sigmoidal behavior with characteristic lag times of up to a few hundreds of seconds at low excitation powers before the actual activation takes place (FIG. 11). There is an UV-induced electron transfer from the lattice oxygen to the silver species, yielding reduced silver that may form highly emissive clusters. After activation the emission intensity mostly reaches a steady-state which is maintained over at least several hours without or with minor photobleaching. The maximum slope in the sigmoidal activation curves shows a non-linear relationship with the applied excitation power (FIG. 11, inset). Fitting the data to a power function yields an exponent of 2.24, which indicates that multiple photons are involved in the formation of the activated cluster, either by a two-photon absorption process or by the occurrence of two independent simultaneous photochemical reactions, causing the reaction kinetics to be of a higher order with respect to the excitation intensity. There an equilibrium between Ag0-cluster creation and destruction of the weak Ag—Ag bonds upon UV-illumination. If the steady-state intensity is reached for a certain excitation power, an additional activation can still take place at higher excitation power until a new steady-state level is reached. This means that the equilibrium between formation and destruction can be shifted by variations in excitation power.

Spectral analysis revealed that the dominant species after activation have a strong greenish emission with a distinct maximum in intensity at 541.8±3.8 nm (FIG. 12) upon 375 nm excitation. Comparison with the heterogeneous emission spectra of the loaded crystals before activation, having emission maxima ranging from 493 till 541 nm, indicates that only a limited amount of cluster types are very specifically formed upon photoactivation and dominate the emission spectrum.

The extremely high luminescence intensity originating from one single activated crystal allows recording wavelength dependent decays by single-photon counting using a PMT detector with an instrumental response function of 90 ps (Table 1). After activation the luminescence decay shows three distinct components of approximately 100 ps, 1 ns and 4 ns. The obtained decays were analyzed globally and fitted by a tri-exponential decay using a time-resolved fluorescence analysis software program (TRFA) [H. K. Beyer, P. A. Jacobs, J. B. Uytterhoeven, Journal of the Chemical Society-Faraday Transactions I 1979, 75, 109] keeping the characteristic decay times, τ, identical for all emission wavelengths. At higher emission wavelengths, the contribution of the fast decay component, and to a less extent also the medium decay component, decreases in favor of the slowest decay (see also Supporting Information). The fact that the three contributions can be spectrally separated indicates the existence of multiple emitting species, being either different silver nanoclusters or identical nanoclusters having different interactions with the zeolite lattice or coordination spheres.

TABLE 1

Contributions and decay times of the different fluorescence decay components measured for two single crystals at different emission wavelengths, obtained by global analysis with linked τ-values for all emission wavelengths of one crystal. Graphical representation of the data can be found in the Supporting Information.

| $\lambda_{em.}$ (nm) | Crystal 1[a] | | | Crystal 2[b] | | |
|---|---|---|---|---|---|---|
|  | $\alpha_{0.12\,ns}$ (%) | $\alpha_{0.92\,ns}$ (%) | $\alpha_{3.41\,ns}$ (%) | $\alpha_{0.20\,ns}$ (%) | $\alpha_{1.26\,ns}$ (%) | $\alpha_{4.03\,ns}$ (%) |
| 460 | 16.1 | 39.0 | 45.0 | 28.0 | 56.3 | 15.7 |
| 480 | 11.7 | 36.1 | 52.2 | 23.2 | 56.6 | 20.1 |
| 500 | 7.6 | 30.2 | 62.3 | 16.3 | 52.7 | 30.9 |
| 520 | 4.5 | 24.4 | 71.1 | 8.7 | 41.5 | 49.7 |
| 540 | 2.7 | 20.7 | 76.6 | 5.2 | 32.3 | 62.5 |
| 560 | 1.6 | 18.6 | 79.7 | 3.6 | 25.0 | 71.4 |
| 580 | 1.5 | 16.9 | 81.7 | 2.7 | 19.8 | 77.4 |
| 600 | 1.4 | 15.9 | 82.8 | 2.5 | 15.8 | 81.7 |
| 620 | 1.2 | 17.3 | 81.5 | 2.6 | 13.7 | 83.7 |
| 640 | 1.3 | 20.9 | 77.7 | 2.7 | 11.8 | 85.5 |

[a]$\chi^2$ of the global fit = 1.039; excitation power: 1.83 kW/cm$^2$
[b]$\chi^2$ of the global fit = 1.174; excitation power: 16.7 kW/cm$^2$.

An in-depth microscopic characterization of the emissive properties of Ag-loaded zeolites is presented. The controllable space-resolved photoactivation of the emission with a diffraction-limited resolution has interesting applications data storage devices. Due to the large stokes-shift, broad emission range and high photostability upon UV-illumination, this highly emissive material may also serve as a potential alternative for use as secondary light source in fluorescence lamps. Moreover, the non-blinking behavior of the emission makes this material tremendously advantageous over single quantum dots for instance as bio-labels.

EXAMPLES

Example 1

Preparation

Various methods for the production of metal ion exchanged molecular sieves are available in the art. A method similar as described by Jacobs et al. (Jacobs, P. A. & Uytterhoeven, J. B., 1979, Journal of the Chemical Society-Faraday Transactions I 75, 56-64) was used for incorporating silver ions in molecular sieves and creating silver clusters. However lots of parameters like loading percentage of the zeolites, exchange time, length of temperature treatment, initial, gradient and final temperature of the temperature treatment, presence of gasses during the temperature treatment (e.g. in vacuum, in presence of oxygen, in presence of oxygen and nitrogen, in presence of hydrogen, in presence of CO and/or $CO_2$ gas) and the presence of moisture in the air influences the finally formed types of clusters, oxidation state of the clusters and distribution and polydispersity of the types of clusters formed.

Example 2

Emission

It was demonstrated that metal ion cluster especially silver in confined molecular sieves have a distinct and tunable emission throughout the VIS and NIR part of the electromagnetic spectrum while they are all excitable in the UV region. Thanks to the host matrix the confined metal clusters are prevented from aggregation with each other to form bigger non emissive nanoparticles. Also they can be shielded from the outside environment (e.g. oxygen) if required by adding a silicon coating around the molecular sieves.

Example 3

Emissive Visible Light Source

The molecular sieve materials and mixtures thereof can be used as emissive material in the production of lamps similar to currently used fluorescent lamps. In fluorescent lamps, generally, primary emission from an UV source (most commonly 254 nm excitation from a Hg source) is absorbed by a layer of material on the inside of a glass tube. This layer then emits visible (white) light. The material now currently used in fluorescent lamps can be replaced by the present invention; metal cluster containing molecular sieves. By mixing different metal cluster containing molecular sieves containing different clusters, different spectral properties can be generated. By changing the ratios of the mixed materials a whole range of light colors can be generated, including white light. If one however wants light of a particular color, one can select a specific metal cluster emission. FIG. 1 illustrates this example, showing a 3A zeolite exchanged with silver (10% weight) that was thermally treated (24 hours at 450° C.) resulting in a partial reduction and formation of small silver clusters in the host matrix. Under UV excitation a green/yellow color can be observed. Other reduction methods, for example by adding $H_2$ gas to a silver ion exchanged solution of zeolites resulted in dominantly blue emission. By adding more silver, emission in the red part of the visible spectrum was created (see also FIG. 1). The synthesis of the oligo metal clusters with the desired emissive properties can be tuned by changing the synthesis parameters. Under the microscope using UV excitation one can see clearly distinct crystals of uniform but different color (FIG. 2). In this sample crystals of different colors were present; however synthesis also allows the production of only one type of emissive species to be present. The orange emitting sample show in FIG. 1 for example diplayed yellow and red crystals on the microscope under UV excitation. FIG. 3 shows a schematic, drawing of a possible design for an emission based lamp on the material presented in this invention. A primary UV source like present now in regular fluorescent lamps excites a layer of the material that is on the inside of a glass or transparent tube. By adjusting the material by either mixing several different color emitting crystals together or creating multiple colored emitting species in one crystal one can create a white light emission. For colored visible emissive lamps one can use just one type of crystal that just emits one color.

Example 4

UV Blocking, VIS Transparent Material

Around the primary UV source and the molecular sieve material containing the emissive metal clusters, a shell should be present which has the following properties. It should preferably block the harmful UV radiation from the primary UV excitation source (e.g. a 254 nm Hg source). An example of this can be glass, which blocks a large portion of the UV spectrum. Other materials can be polycarbonate, UV resistance plastics (TYGON® UV Resistant, e.g. ULTRABLOCKT UV-Resistant materials) UV Resistant Polyethylene (Film Polyflex® 234). This shell can be of any shape or form, can be hard or flexible.

Example 5

Primary UV Source

The radiation source may comprise a gas, such as mercury which is currently used in fluorescent lamps (normally 254 nm light) or a high pressure mercury vapor lamp, or a noble gas, such as Ne, Ar and/or Xe in a plasma display. UV energy is provided by causing a discharge in a gaseous medium contained in a UV transparent bulb or envelope. Typical gas fillings include mixtures of argon (and/or other gases such as xenon Xe, krypton Kr) and mercury Hg which, upon discharge therein, is rich in ultraviolet radiation (other UV rich gases on ionization may be used). Typically, a ballast power supply is connected to the electrodes. In electronic ballast systems, a step-up transformer provides a high striking or ionization voltage, several hundred volts (which, once the lamp is energized, is lowered to a normal operating voltage. This is normally in the range of 100-200 volts). There are a number of ways of producing UV sources, several of which are discussed in two U.S. Pat. Nos. 5,334,913 issued 1994 by Ury and 4,990,789 issued 1991 by Useaki. In addition, there are a number of selective emitters and methods for making them, which have been described in U.S. Pat. Nos. 5,500,054, 5,686,368 and 6,104,031 and application No. 60/089,176 Filed Jun. 12, 1998 herein incorporated by reference.

Other radiation sources may comprise a laser diode or an organic light emitting diode (OLED) or semiconducter LEDs (e.g. InGaN light emitting diode). If desired, plural radiation sources may be used in the system. Other sources of UV radiation can be a UV laser or broadband low power UV source, for instance a broadband deuterium lamp. This primary UV source is surrounded by the molecular sieves containing the oligo atomic metal clusters for converting radiation emitted by a radiation source to visible light.

Basically any primary source that answers to the following conditions: The radiation source may comprise any radiation source capable of causing an emission from the molecular sieves containing the oligo atomic metal clusters for converting radiation emitted by a radiation source to visible light.

Example 6

Support Material for the Molecular Sieves Containing Oligo Atomic Metal Clusters Some support material might have to be added to structurally hold the molecular sieves containing the small Au or Ag clusters around the primary UV source and to make sure that the emission exits the surrounding covering shell in a homogenous way. This supporting material can be anything as long as it is resistant to UV and visible radiation, does not absorb too much UV radiation from the primary UV source and is heat resistant.

Example 7

Tunable Color of Excitation and Emission of the Visible Emission Source

The molecular sieves containing the oligo atomic clusters can be excited by UV light resulting in emission in the visible range as described in example 3. However by changing or tuning the excitation wavelength or by using multiple excitation wavelengths coming from one or multiple sources and by tuning the different ratios of excitation power between the different wavelengths, it is possible to tune the color of the visible emission. In this way one could have one emissive device which output color can be tuned by the end user. This effect can be achieved by using different oligo atomic clusters in the molecular sieves that have a different emissive responds on different UV wavelengths. This is also illustrated in FIG. 3. An example of this was synthesized where irradiation of the materials with 360 nm light resulted in blue emission while exciting at 254 nm resulted in yellow emission. If one would excite with the two wavelengths, 254 nm and 360 nm at same time and by changing the ratios of excitation power, one could create a whole range of emission colors between blue and yellow and all the possible sum colors.

Example 8

Micro Lasers

Since these molecular sieves containing oligo atomic clusters, generally are zeolite materials which are crystals in the micrometer range, one could construct a lasing cavity around a single crystal and create a micrometer sized laser.

Example 9

Bright Emissive Markers

Since the oligo atomic clusters containing molecular sieves are a bright emissive material, consisting of generally micrometer or submicrometer sized crystals, one can use these small crystals as bright emissive markers (see also FIG. 2). Especially when they are smaller than 100 nm they can be used as alternatives for fluorescent beads or quantum dots.

Example 10

High and Stable Luminescence Materials

Synthesis of Ag-Exchanged Zeolite A-Materials

Zeolite 3A (Union Carbide; 500 mg) was suspended in 100 mL MQ-water containing 13±1 weight percent of silver nitrate (8±1% Ag). After stirring in the dark for 2 hours the ion exchange (±17% of the zeolite's cation exchange capacity) was stopped. The material was poured on a Büchner filter and extensively washed with MQ-water. This washing stepped proved a quantitative silver exchange since no precipitation with chlorides was observed in the washing water. The recovered white powder on top of the filter was heated at 450° C. Celsius for 1 day. After this heat treatment a white to sometimes slightly yellowish powder was obtained. The powder was stored in the dark under dry atmosphere.

Bulk Characterization of the Ag-Loaded Zeolites

Emission spectra were recorded at different excitation wavelengths ranging from 260 nm till 660 nm at 20 nm intervals on a Horiba Jobin Yvon FluoroLog fluorimeter. The powder was sandwiched between two quartz plates and mounted in the fluorimeter. Emission was detected in "front face mode". At least three distinct emissive species can be identified from these spectra, as seen in FIG. 4.

Single Crystal Measurements

Description of the Setup

As an excitation light source, the frequency doubled output (375 nm, 8.18 MHz, 0.8 ps FWHM) of a mode-locked Ti:Sapphire laser (Tsunami, Spectra Physics) was used to excite the single crystal. The excitation light, circularly polarized by use of a Berek polarization compensator (New Focus), was directed by using a dichroic beam splitter into the oil-immersion objective (Olympus, 1.3 N.A., 100×) of an inverted microscope (Olympus 1×70) equipped with a scanning stage (Physics Instruments). The excitation power was adjusted with a neutral density wheel at the entrance port of the microscope. The fluorescence was collected by the same objective, filtered (400 nm longpass, Chroma Technology), split with a non-polarizing beam splitter (50:50) and focused for one path into a polychromator (Spectra Pro150 Acton Research Corporation) coupled to a back illuminated liquid nitrogen cooled CCD camera (LN/CCD-1340×400, Princeton Instruments) in order to record fluorescence spectra with a resolution down to 1 nm. The other path was focused onto an avalanche photo-diodes (SPCMAQ-15, EG & G Electro Optics) and used to get scanning images. These scanning images were obtained using an excitation power of 15 W/cm$^2$ and for each pixel the intensity was integrated over 2 ms.

For the decay measurements at specific wavelengths, all the fluorescence was collected and focused into a 100 micron multimode optical fiber. The output of the fiber was mounted at the entrance of a double monochromator (Sciencetech 9030, 6 nm bandwith) and the fluorescence was detected with a microchannel plate photomultiplier (MCP-PMT, R3809U, Hamamatsu) equipped with a time correlated single photon counting card (Becker & Hickl, SPC 830). The fluorescence decay analysis was performed with a home-made time-resolved fluorescence analysis (TRFA) software which takes pulse deconvolution into account, based on the Marquardt algorithm that uses a reweighted iterative reconvolution method of the instrumental response function of the setup with tri-exponential model function (M)[1]:

$$IRF_J \otimes M_J = \sum_I [\alpha_{IJ} \exp(-jT/k\tau_I)] + U \qquad (1)$$

with j ranging from 1 till k with k the number of channels over which the photons of a decay are spread and i the number of exponential terms. Here T is the time window of the experiment, a and t are amplitude and decay time and U is a constant accounting for non-correlated background. The experimental instrument response function was determined in the order of 90 ps by using the scattering of the laser on the cover glass.

The fluorescence decays were analyzed first individually in terms of decays times $\tau_1$ and their associated pre-exponential factors $a_i$. The final curve-fitting was done by global analysis using a tri-exponential decay function with linked τ-values for all the decays of one crystal recorded at different emission wavelengths over the emission spectrum and the fitting parameters were determined by minimizing (non linear least squares) the global, reduced chi-square $\chi^2_g$. The contribution of the decay times recovered after the global analysis was estimated using the relative amplitudes:

$$\alpha_I = \frac{\alpha_j \cdot \tau_I}{\sum_I \alpha_I \cdot \tau_I} \qquad (1)$$

The goodness of the fits was judged for each fluorescence decay trace separately as well as for the global fluorescence decay by the values of the reduced $\chi^2$, and the visual inspection of the residuals and autocorrelation function.

All decay curves presented here had a $\chi^2$ value below 1.46 (most of them even below 1.1). As an example, three decay curves of crystal 1 for three different emission wavelength from the tri-exponential global fit are shown in FIG. 5. The residuals show a perfect random behaviour indicative for the high quality of the global fit.

The trends in contribution of the different decay components as a function of lifetime for the two crystals presented in the article are graphically highlighted in FIG. 6.

Measuring Single Crystal Emission Spectra and Constructing Activation Curves

Emission spectra where measured as a function of time (one spectrum every second) for a single crystal. The obtained spectra were smoothed using a binomial filter. The wavelength of maximum emission at the end of the activation process was determined and the intensity at this wavelength was plotted during the entire activation process to construct the activation graphs in FIG. 1 of the article.

FIG. 7 shows that after the emission reaches its plateau intensity upon a certain UV illumination power, this irradiated spot can be further activated by increasing the excitation power. This observation suggests that these plateaus are representing steady-state conditions, typical for each excitation power in which cluster formation and destruction are in equilibrium.

Single Crystal Emission Time Transient and Autocorrelation Graph

FIG. 8 shows the emission intensity time transient (binned at 500 μs; recorded using the APD connected to the Becker & Hickl SPC830 counting card) before (upper part) and after (lower part) photoactivation by UV irradiation, together with the autocorrelation graph performed directly on the photon arrival times. From these graphs it is concluded that the single crystal's emission doesn't show blinking or intensity fluctuations in a time range from less than 1 μs till 0.1 s. The assumption that the individual crystals contain a big amount of emitters is therefore reasonable.

SEM Pictures of the Ag-Loaded Zeolites.

SEM-pictures of the used zeolites (after loading with silver and calcinations) are recorded using a Philips XL30-FEG (FIG. 8). The average crystal size is about 3 μm. For about 20% of the observed crystals larger aggregates (presumably silver nanoparticles) can be resolved at the crystal's outer surface. These relatively big particles are supposed to be non-emissive. Moreover, for the fluorescence microscope experiments we always focused as much as possible in the center of a crystal. As the pinhole in the emission path efficiently rejects out-of-focus light, we can be sure that the observed emission and photoactivation originates from intrazeolite silver particles.

BRIEF DESCRIPTION OF THE DRAWINGS

The present invention will become more fully understood from the detailed description given herein below and the accompanying drawings which are given by way of illustration only, and thus are not limitative of the present invention, and wherein.

Figure 1:
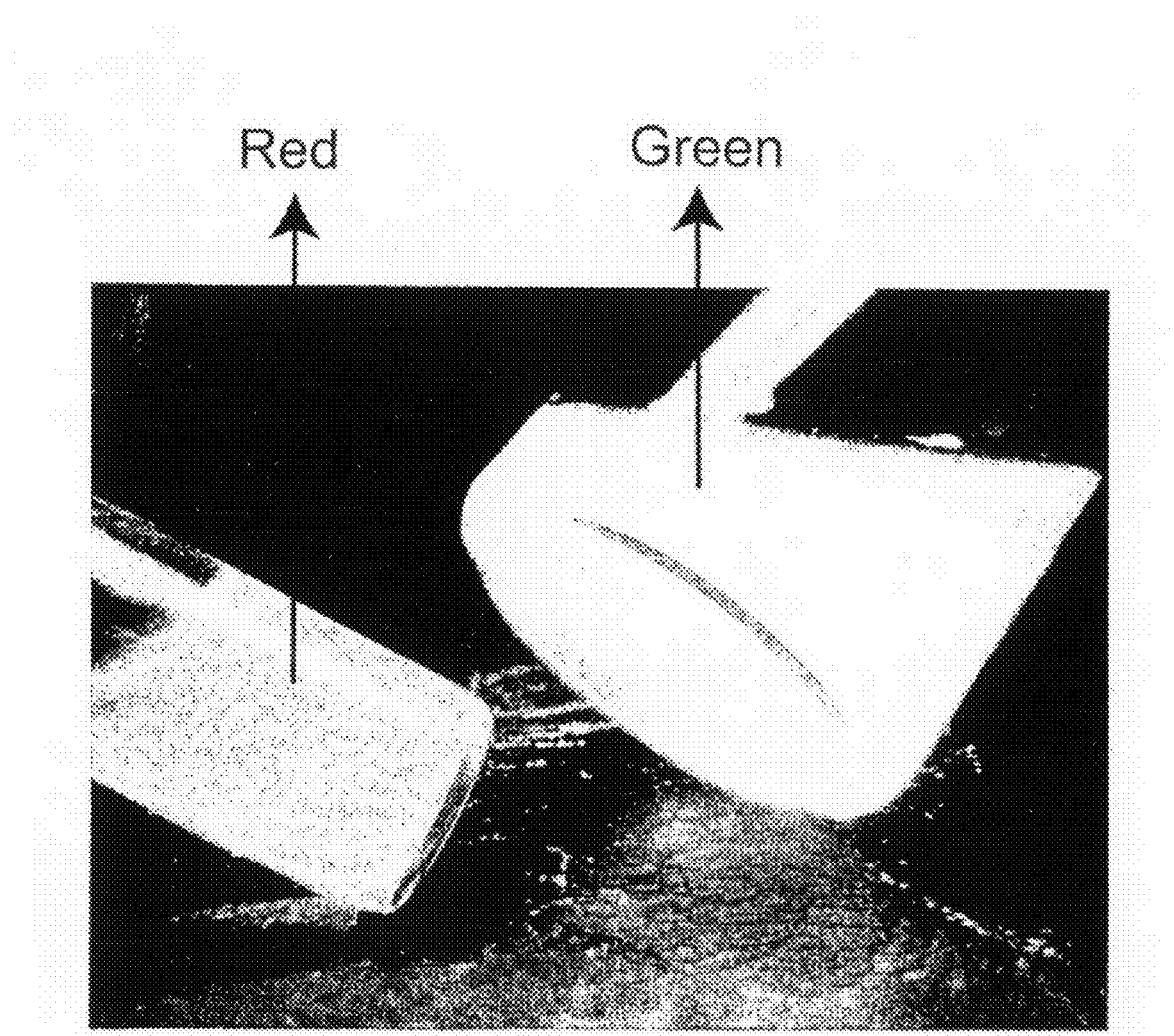
FIG. 1: provides photograph with an example of different colors of emission of zeolite 3A filled with silver when excited with 254 nm UV light.
Figure 2:
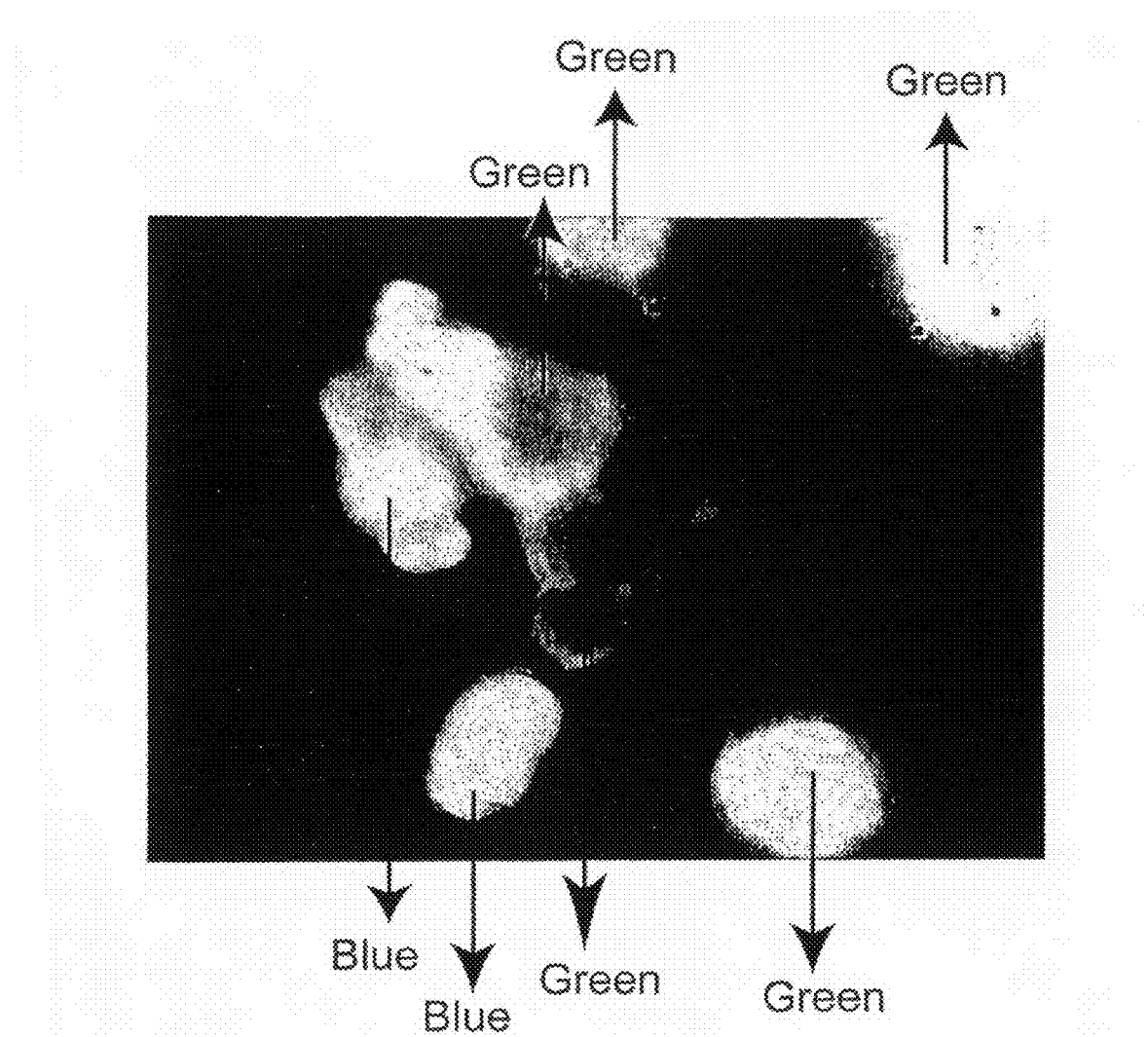
FIG. 2: Image of the detected emission of individual zeolite crystals (taken from the sample in FIG. 1 on the right) excited with UV light under the microscope. Clearly individual brightly colored crystals are present.
Figure 3:
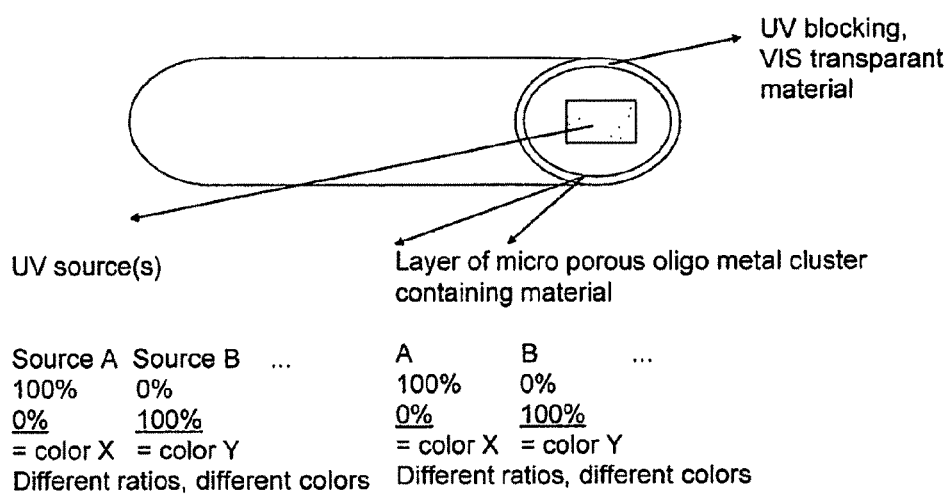
FIG. 3: Scheme of an emissive lamp containing a layer of microporous oligo metal clusters containing material.
Figure 4:
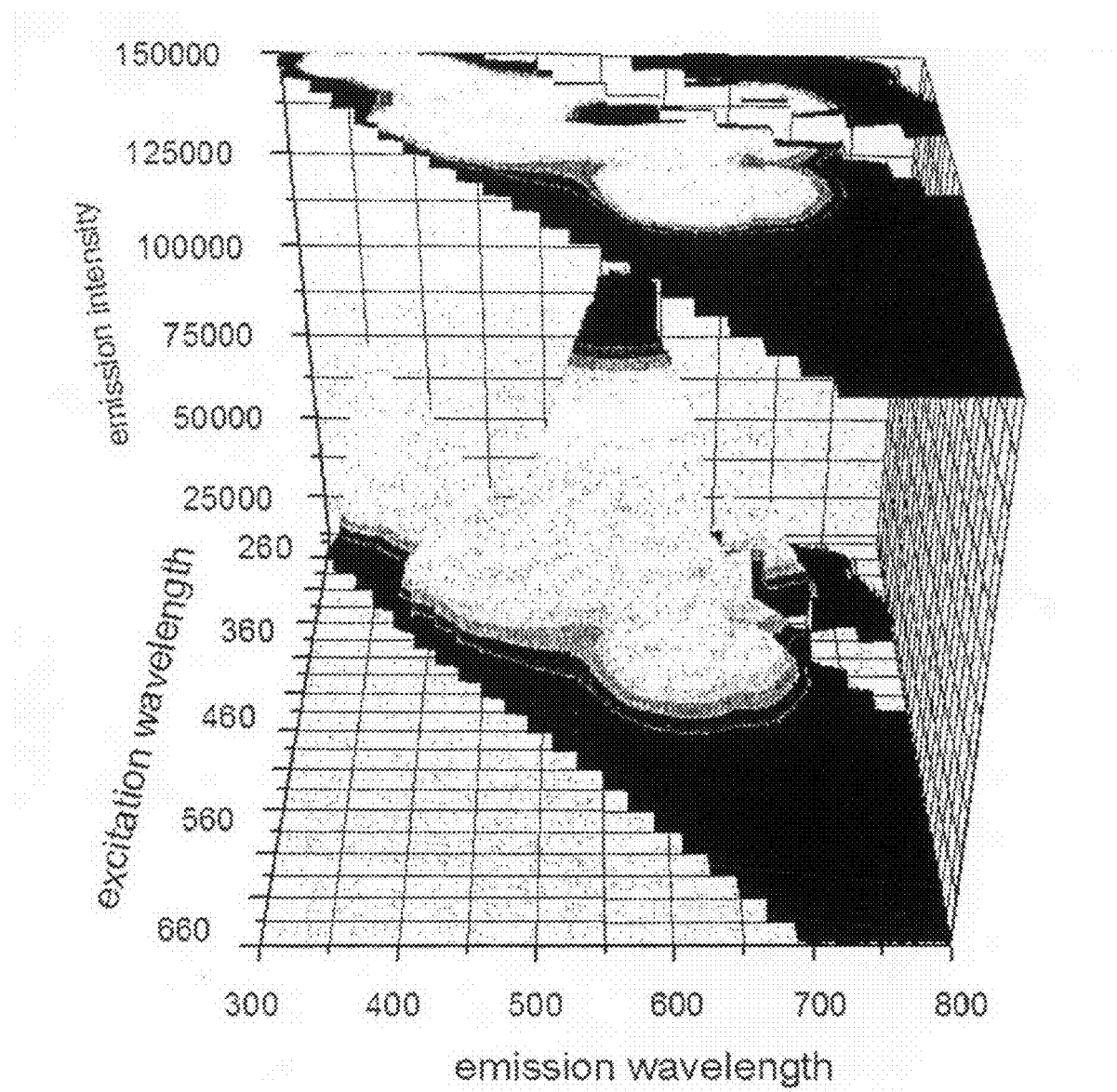
FIG. 4: Emission spectra of Ag-exchanged zeolite A powder at different excitation wavelengths.
Figure 5:
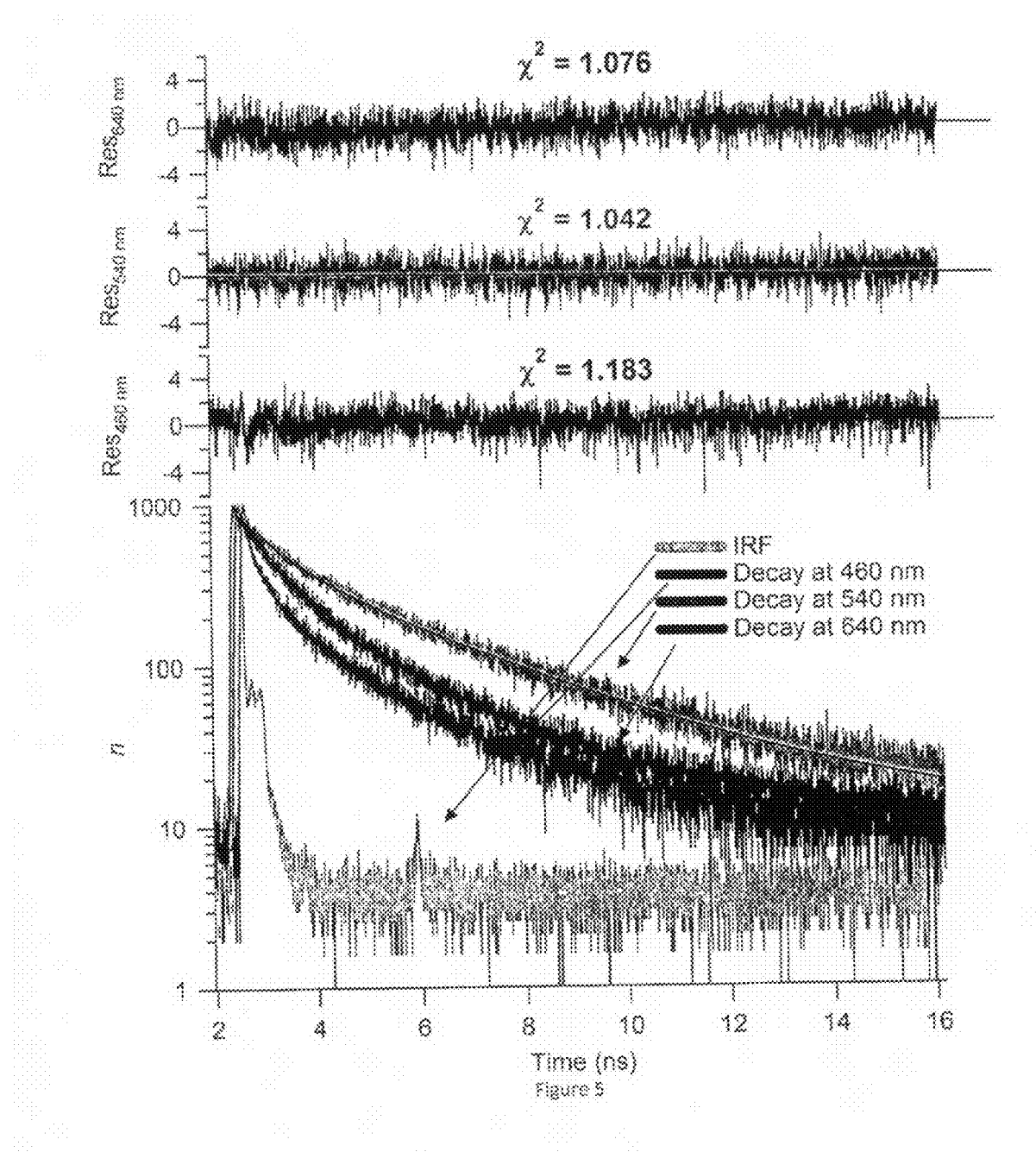
FIG. 5: Three fluorescence decay curves and their global fitting results for crystal 1.
Figure 6:
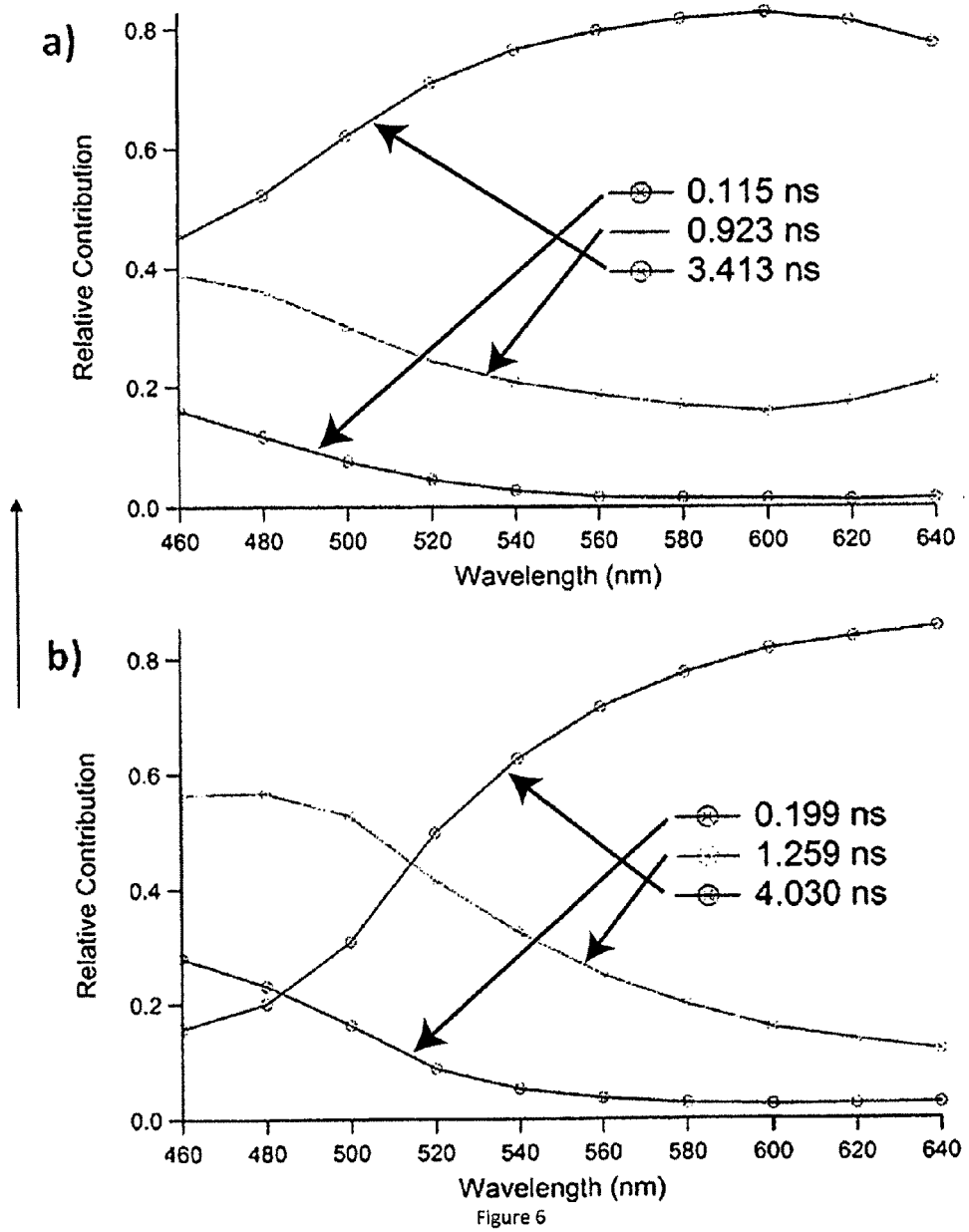
FIG. 6: Relative contributions of the decay components as a function of emission wavelengths for crystal
Figure 7:
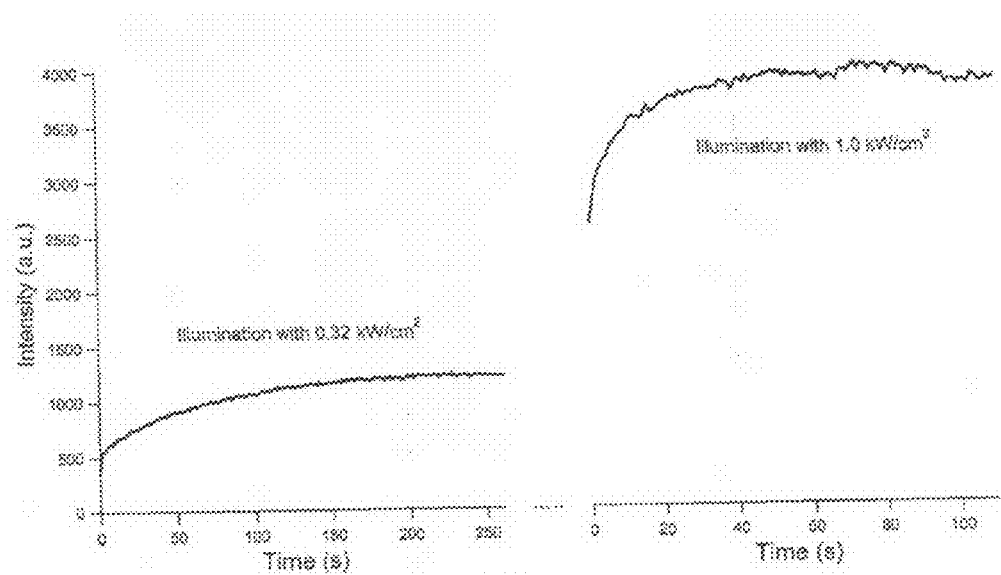
FIG. 7: Activation curves of the same spot in a Ag,K-zeolite upon successive illumination at 0.32 and 1.0 kW/cm2.
Figure 8:
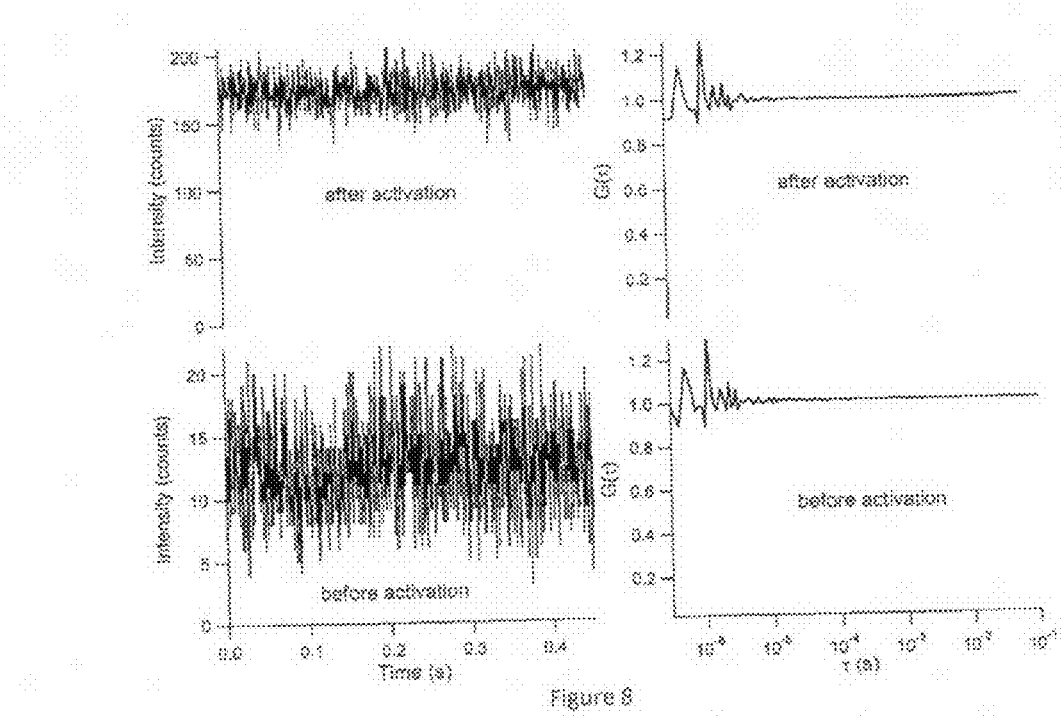
FIG. 8: Intensity time transient binned at 0.5 ms (left) with the corresponding autocorrelation (G(τ)) graph (right) for a single Ag loaded zeolite 3A before (upper part) and after (lower part) photoactivation by UV irradiation.
Figure 9:
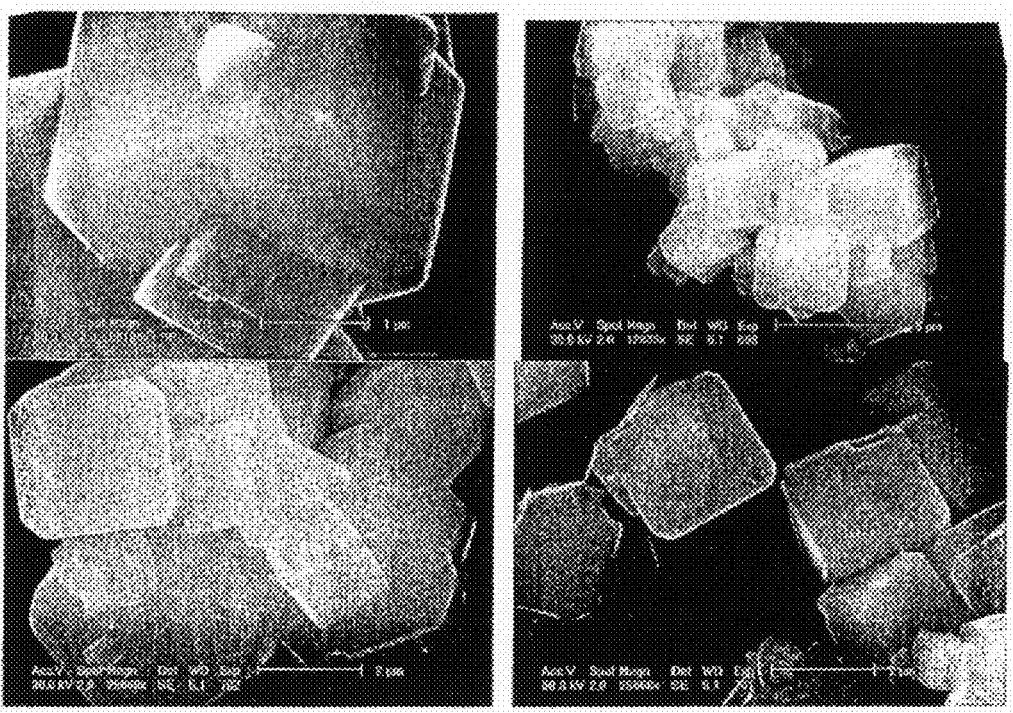
FIG. 9: SEM pictures of Ag-loaded zeolite 3A crystals.
Figure 10:
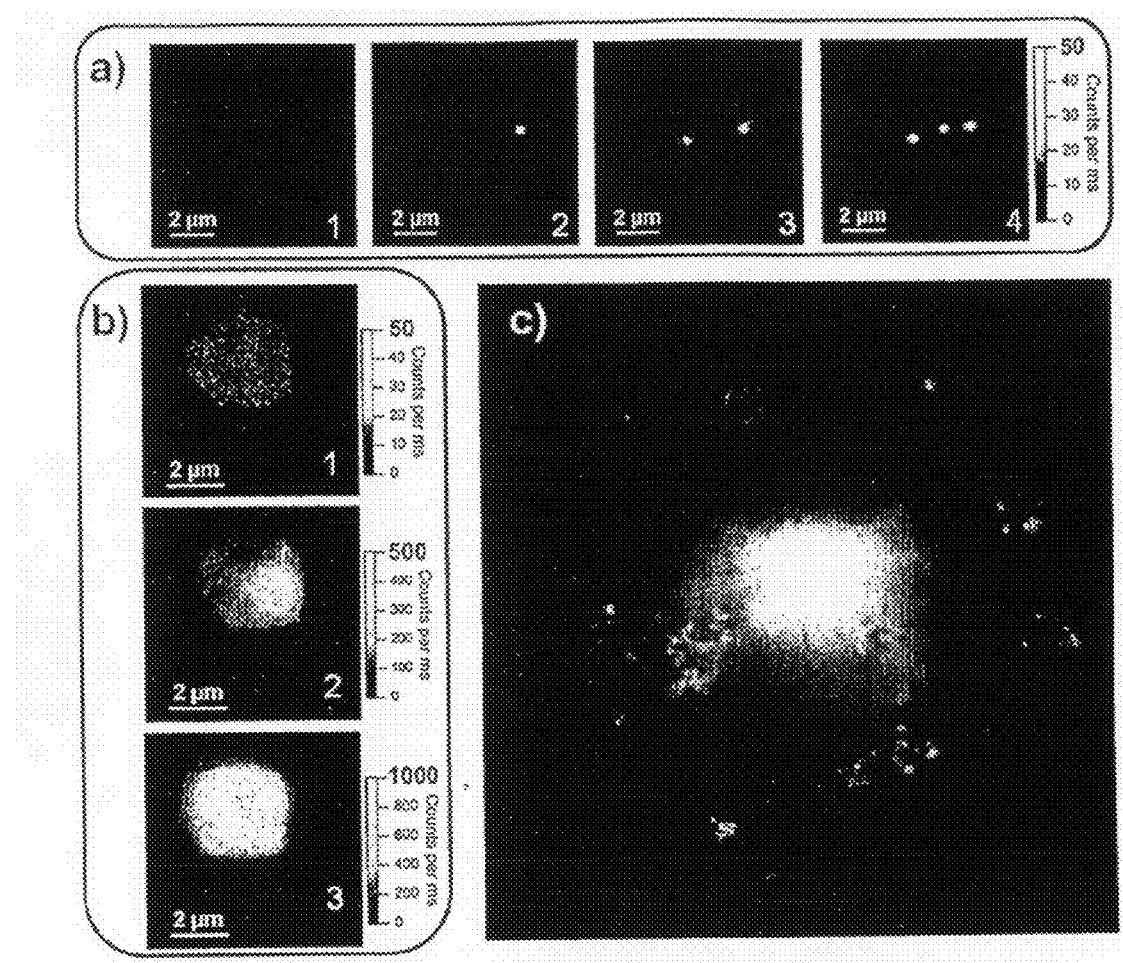
FIG. 10: a) False color emission image of a single silver-exchanged zeolite A crystal before photoactivation (1) and after consecutive activation of three individual spots (2, 3 and 4) in one crystal by irradiation with a ps 375 nm laser at 10 W/cm$^2$ during 20 minutes for each spot through a confocal microscope. b) Total activation of a single crystal. (1) shows the crystal before activation. After 5 min of irradiation by a 16.7 kW/cm$^2$ pulsed 375 nm beam the intensity increased by a factor 10 (2). Another 20 minutes of activation at the same power yielded a total intensity increase of a factor 20. Note the increased scaling range from (1) till (3). The images in a) and b) were taken by a confocal microscope under irradiation by a 375 nm pulsed excitation source of respectively 10 and 20 W/cm$^2$, with 2 ms integration time per pixel. c) True color image taken with a digital camera (Canon PowerShot A710 IS with a 400 nm longpass filter in front of the lens to filter out the excitation light) through the eye piece of the microscope showing the green emission from the same zeolite after complete activation at 16.7 kW/cm$^2$ excitation power.
Figure 11:
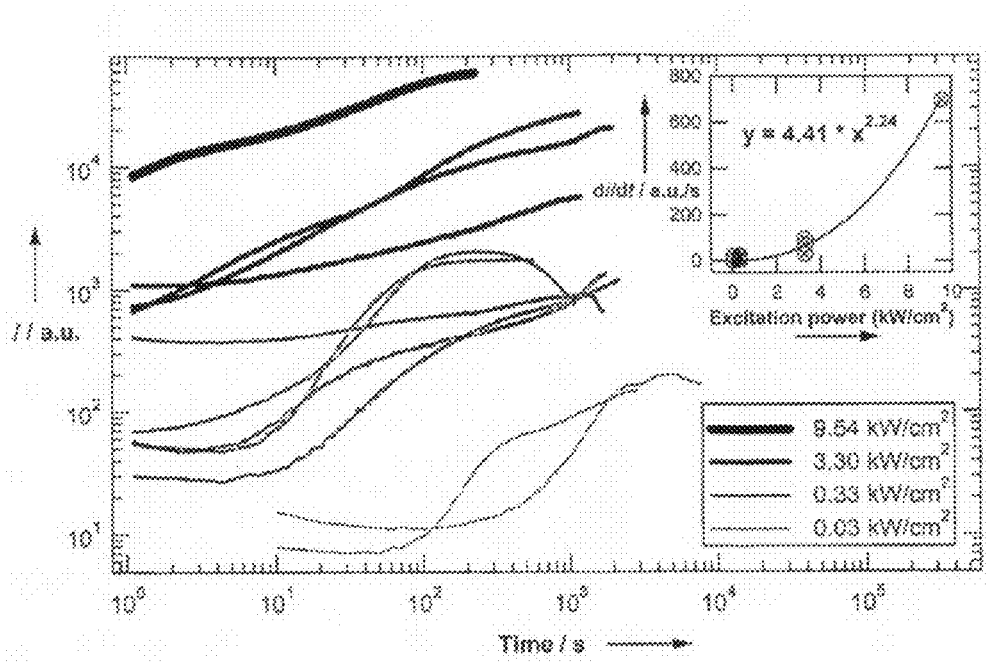
FIG. 11. Log-log plot of the time evolution of the emission intensity (I) (activation curves) of 11 different single Ag-loaded zeolite crystals excited with four different intensities for the activation. The inset shows a plot of the maximum activation rate (dI/dt of the linear part of the activation curves) achieved for each crystal as a function of excitation power. These data points were fitted by a power function and show a non-linear behavior.
Figure 12:
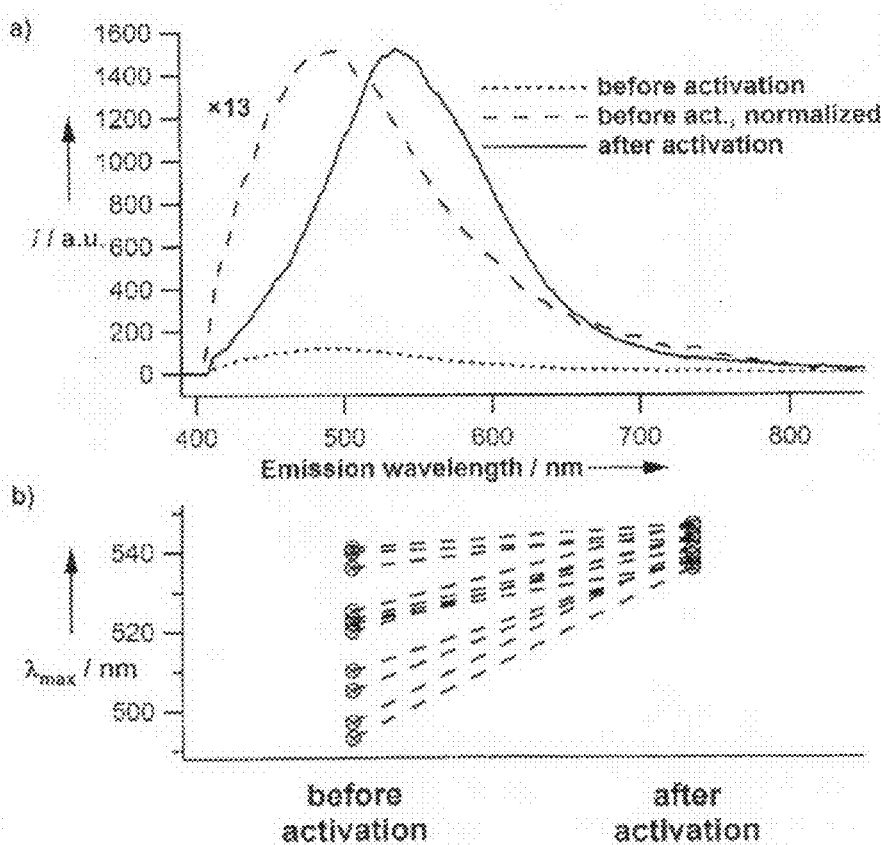
FIG. 12. a) Emission spectrum before and after photoactivation for one single crystal. The dotted line shows the spectrum before activation in real scale with respect to the spectrum after activation (full line), while the dashed line represents the spectrum before activation normalized (×13) to the maximum intensity after activation. b) Emission maximum before and after photoactivation for 12 single crystals. This maximum shifts from a broad range before activation to a rather small band around 540 nm after photoactivation. All spectra were taken upon excitation by a 375 nm ps laser at excitation powers ranging from 33 W/cm2 till 9.5 kW/cm2.

What is claimed is:

1. An emissive lamp comprising at least one radiation source and at least one emission element, wherein the emission element comprises an assembly of oligo atomic Au and/or Ag clusters confined in zeolites selected from zeolite 3A, zeolite 13X, zeolite 4A, zeolite 5A, ZKF and combinations thereof such that when the radiation source irradiates the emission element in a wave length range below 400 nm the emission source converts invisible radiation emitted by the radiation source at or above room temperature to visible light.

2. The emissive lamp according to claim 1, comprising at least one radiation source which when operational irradiates at wave lengths below 280 nm.

3. The emissive lamp according to claim 1, further comprising an envelope surrounding the radiation source and the emission element.

4. The emissive lamp according to claim 3 wherein the envelope is a bulb or a tube.

5. The emissive lamp according to claim 3, wherein the envelope is radiation resistant.

6. The emissive lamp according to claim 5, wherein the envelope is UV resistant.

7. The emissive lamp according to claim 1, wherein the radiation source is a medium wavelength UV (UVG) ray radiation source.

8. The emissive lamp according to claim 1, wherein the radiation source is a Far UV (FUV) or vacuum UV (VUV) ray radiation source.

9. The emissive lamp according to claim 1, wherein the radiation source is an Extreme UV (EUV) or deep UV (XUV) ray radiation source.

10. The emissive lamp according to claim 1, further comprising a radiation transmission element for transmitting the visible light in a desired direction.

11. The emissive lamp according to claim 10, wherein the radiation transmission element directs the invisible radiation to the assembly of oligoatomic Au and/or Ag clusters confined in said zeolites.

12. The emissive lamp according to claim 1, wherein the assembly comprises oligo atomic Au and/or Ag clusters confined in said zeolites which are embedded in a matrix.

13. The emissive lamp according to claim 12, wherein the matrix further comprises a particle binder.

14. The emissive lamp according to claim 1, wherein the assembly is a powder assembly of oligo atomic Au and/or Ag clusters confined in said zeolites.

15. The emissive lamp according to claim 1, wherein the radiation source is a laser or a light emitting diode radiation source.

16. The emissive lamp according to claim 1 for the generation of white light or specific colored light.

17. The emissive lamp according to claim 1, wherein said emission element consists of an assembly of different oligo atomic Au and/or Ag clusters confined in one or a combination of multiple zeolites to create light at a predetermined color temperature.

18. The emissive lamp according to claim 1, wherein the pores of said zeolites containing the oligo atomic Au and/or Ag clusters are coated by a coating matrix or are closed by stopper molecules.

19. A method for converting at or above room temperature invisible radiation from a radiation sorce to visible light comprising: directing the exciting radiation at a wave length below 400 nm from said radiation source by direct contact with or via radiation transmission element or medium to an assembly of oligo atomic Au and/or Ag clusters confined in zeolites selected from zeolite 3A, zeolite 13X, zeolite 4A, zeolite 5A, ZKF and combinations thereof such that when the radiation source irradiates the emission element in a wave length range below 400 nm the emission source converts invisible radiation emitted by the radiation source at or above room temperature to visible light.

* * * * *